US012264080B2

(12) United States Patent
Masten, Jr.

(10) Patent No.: US 12,264,080 B2
(45) Date of Patent: Apr. 1, 2025

(54) METHOD FOR REMOVING CARBON DIOXIDE FROM A MATERIAL

(71) Applicant: James William Masten, Jr., Everett, WA (US)

(72) Inventor: James William Masten, Jr., Everett, WA (US)

( * ) Notice: Subject to any disclaimer, the term of this patent is extended or adjusted under 35 U.S.C. 154(b) by 0 days.

(21) Appl. No.: 18/540,326

(22) Filed: Dec. 14, 2023

(65) Prior Publication Data

US 2024/0140814 A1  May 2, 2024

Related U.S. Application Data

(63) Continuation of application No. 18/174,405, filed on Feb. 24, 2023, now Pat. No. 11,845,669.

(60) Provisional application No. 63/416,447, filed on Oct. 14, 2022.

(51) Int. Cl.
*C01F 11/16* (2006.01)
(52) U.S. Cl.
CPC .................................... *C01F 11/16* (2013.01)
(58) Field of Classification Search
CPC ...................................................... C01F 11/16
See application file for complete search history.

(56) References Cited

U.S. PATENT DOCUMENTS

| 10,718,527 B2 | 7/2020 | Masten |
| 10,738,368 B2 | 8/2020 | Masten |
| 2021/0060463 A1 | 3/2021 | Masten |
| 2022/0290280 A1 | 9/2022 | Masten |

FOREIGN PATENT DOCUMENTS

| CN | 100361917 C | 1/2008 |
| RU | 110467 | * 11/2011 |
| RU | 2677724 C1 | * 1/2019 |

* cited by examiner

*Primary Examiner* — James A Fiorito

(57) ABSTRACT

A process for removing carbon dioxide from a material includes introducing the material onto a first segment of a conveyance system comprising the first segment and a second segment that is physically separated from the first segment, heating the material at the first segment for a first time using a first infrared emitter, conveying the material from the first segment to the second segment, and heating the material at the second segment for a second time using a second infrared emitter. The carbon dioxide removed from the material can be captured by a vacuum pump and stored, and the vacuum pump can maintain a partial pressure for the process. The process can be used to create lime and clinker with minimal CO2 emissions and to remove CO2 that is stored in various materials.

15 Claims, 16 Drawing Sheets

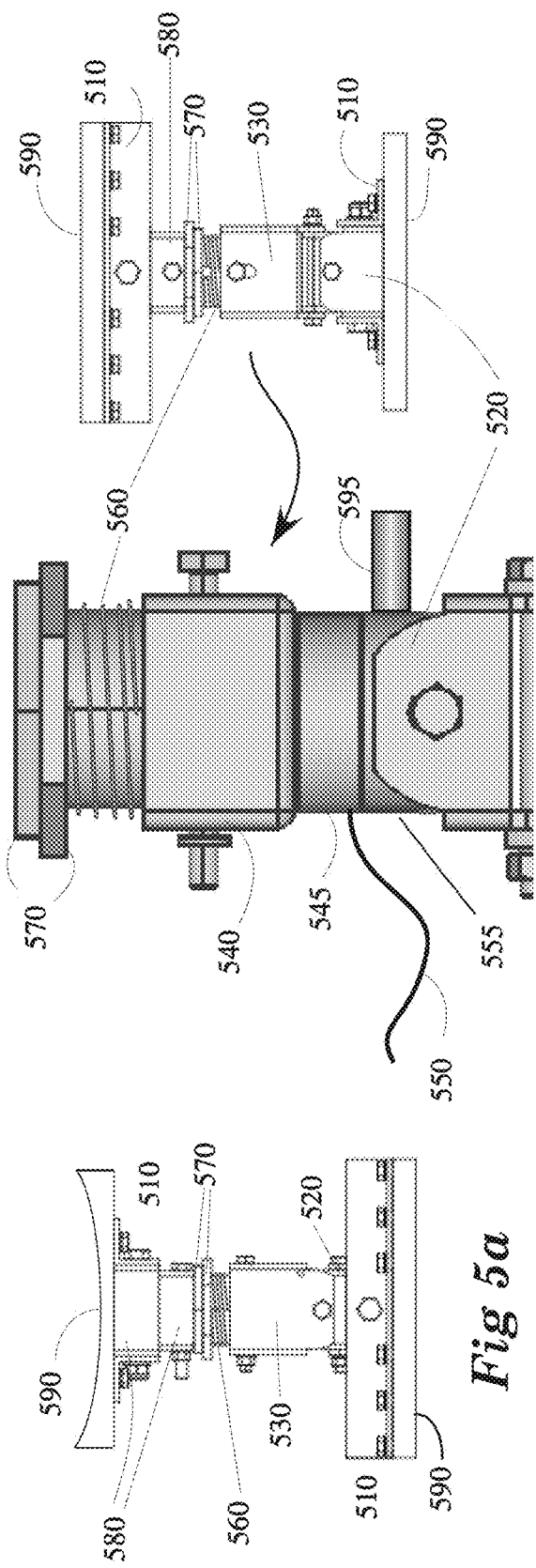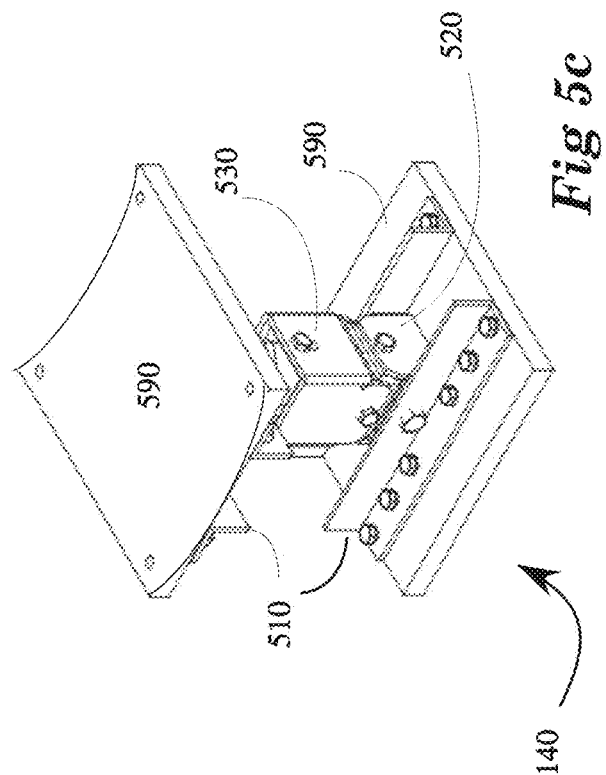

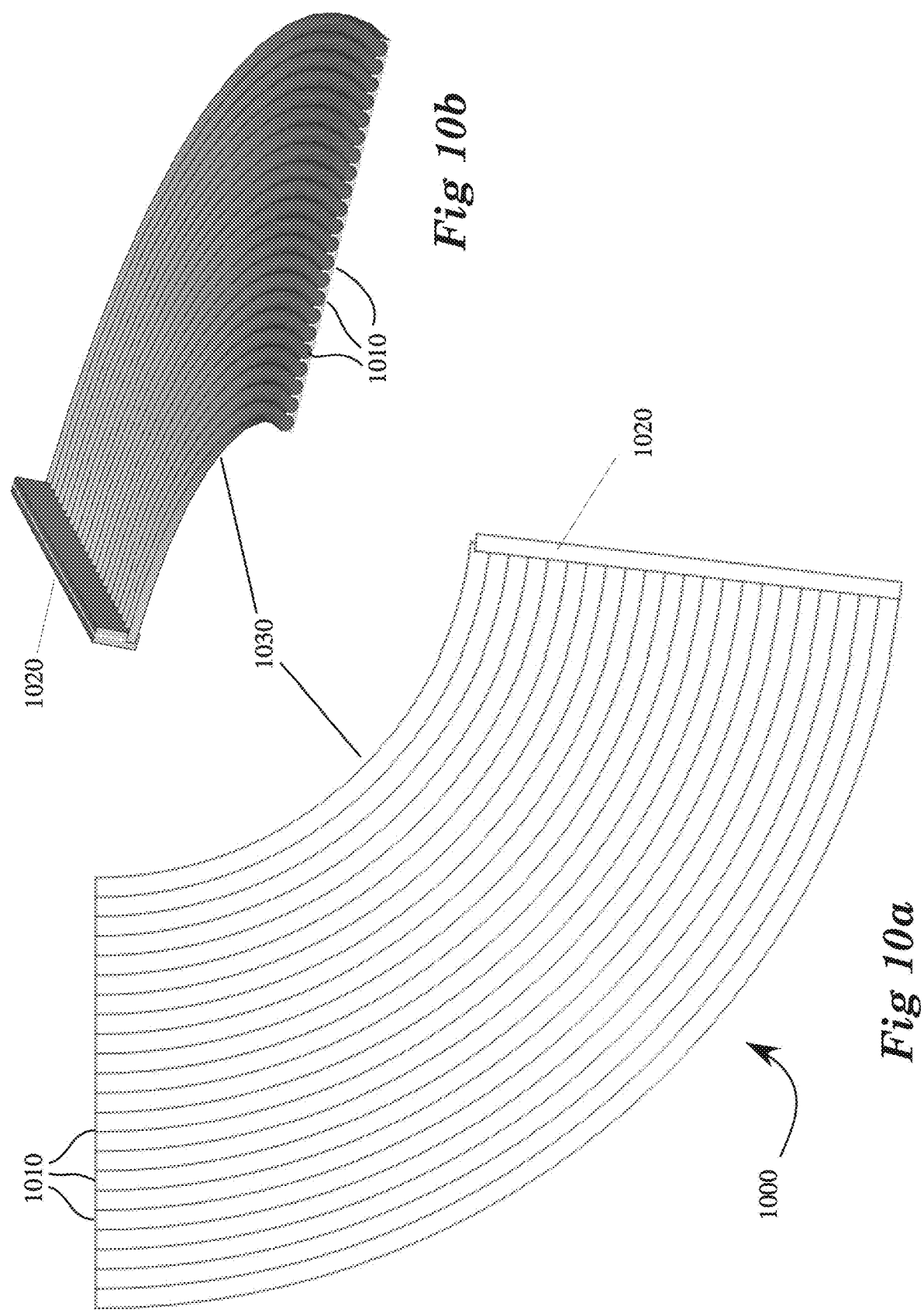

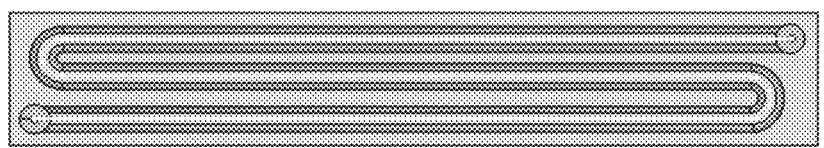
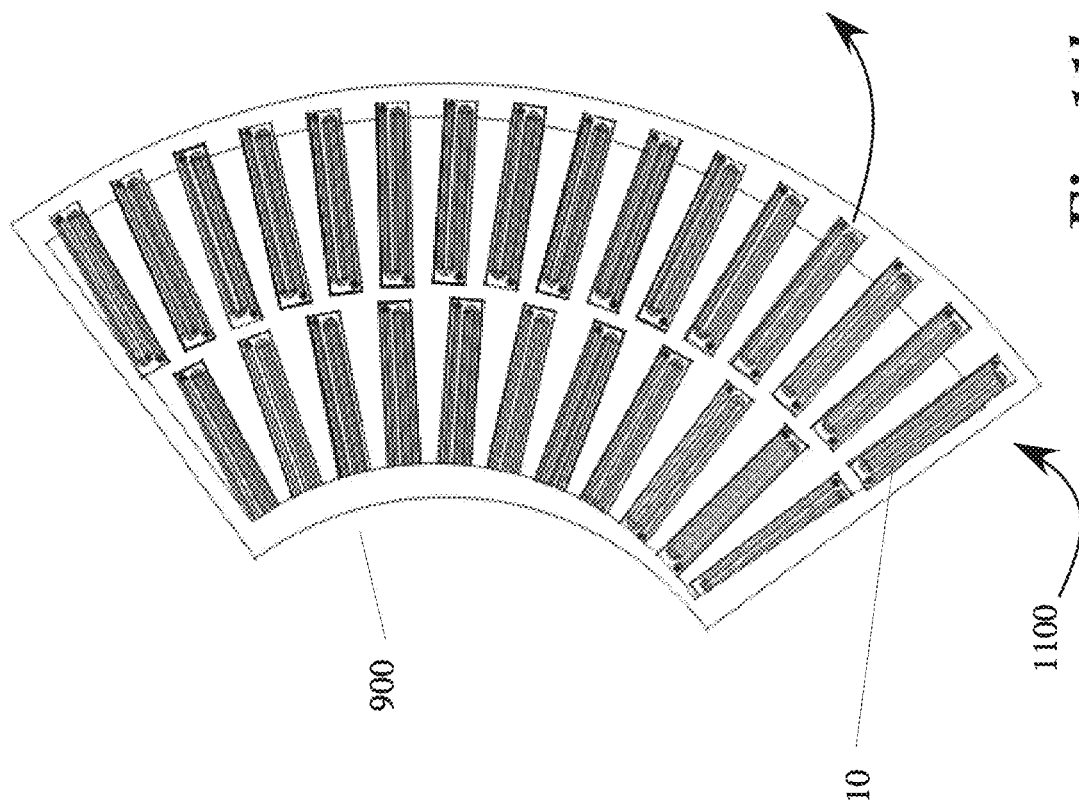
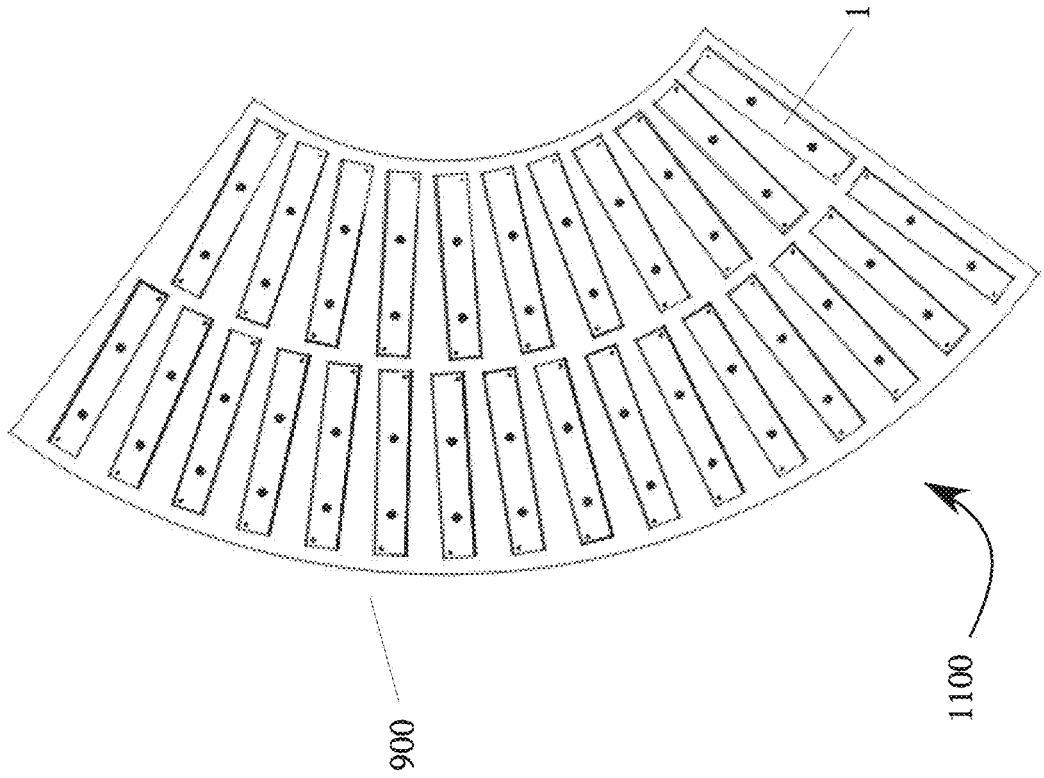

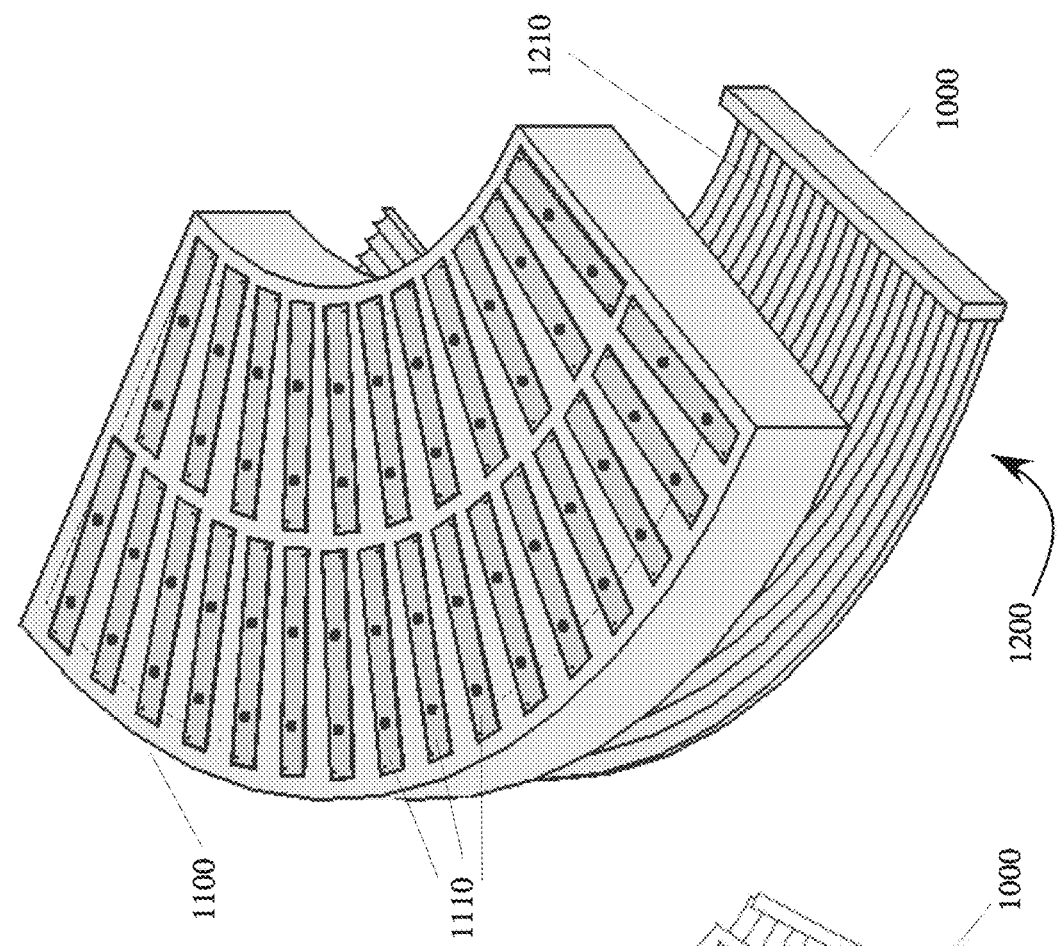
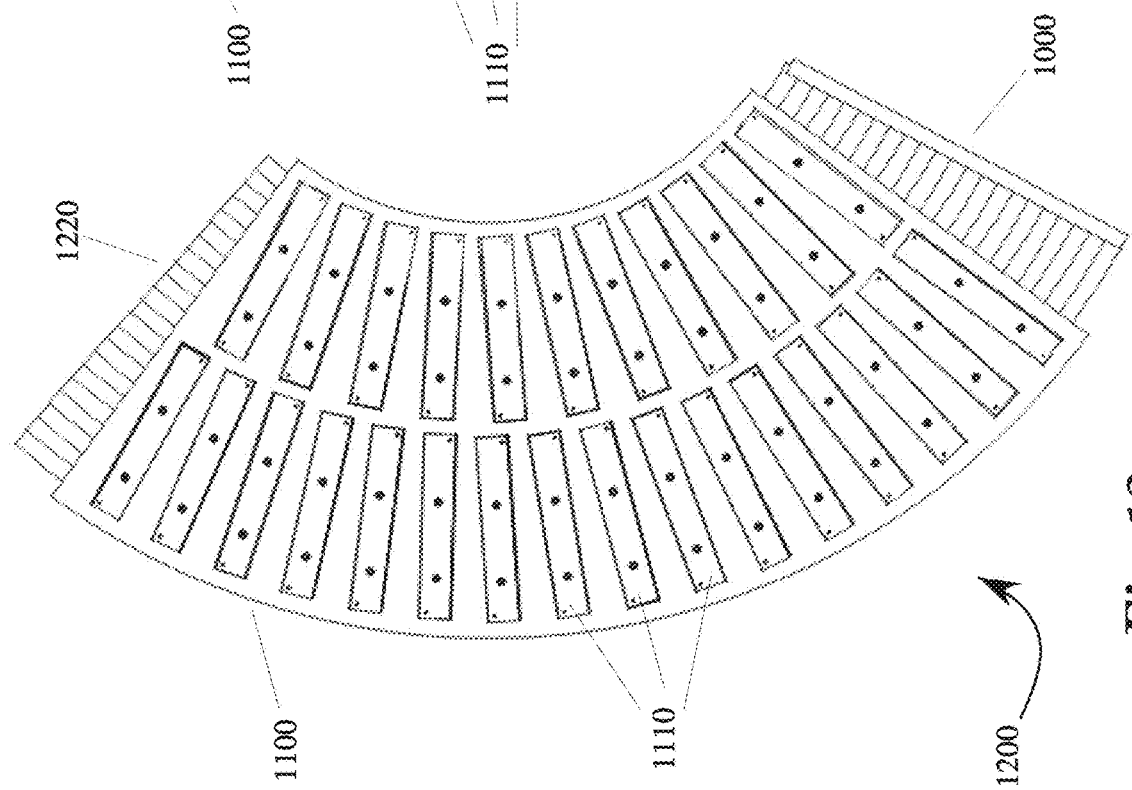

1700

1800

METHOD FOR REMOVING CARBON DIOXIDE FROM A MATERIAL

CROSS REFERENCE TO RELATED APPLICATIONS

The present non-provisional patent application is a continuation of U.S. patent application Ser. No. 18/174,405 filed Feb. 24, 2023, now U.S. Pat. No. 11,845,669 issued Dec. 19, 2023, which claims priority to U.S. Provisional Application No. 63/416,447, filed on Oct. 14, 2022, which are incorporated by reference in their entirety.

BACKGROUND

Lime is fundamentally important to all industrial societies. Modern urban life would be impossible without lime. The very fabrics of modern society are steel, concrete and glass. Each ton of these foundational mediums contains between 100 and 600 pounds of lime. More importantly, even modern man does not know how to create steel, concrete, glass or many other materials without lime. There is no substitute for lime in the operating room, in submarines or in most pharmaceuticals, cosmetics and paints.

Lime, or Calcium Oxide (CaO), has long been known as a reactive substance that can be used to drive many chemical reactions. Archeologists have found indications that lime was processed from limestone as far back as 7,500 BC and used as mortar in pyramids built around 3,000 BC. In Europe, lime was first widely used to build homes in the period from 1300 to 1800 AD.

The processing of lime from limestone has not functionally changed in all that time. Historically, a fuel such as coal or coke were packed along with chunks of limestone about the size of a human head into an insulated cavity built into a hill or at the end of a valley so that natural convection currents would provide oxygen to the fire and suck away the carbon dioxide liberated from the limestone.

Since the beginning of the industrial age, large rotating refractory-lined iron drums known as lime kilns have been used to "burn limestone" to make lime on an industrial scale. These large systems are costly and very inefficient technologies that produce abundant volumes of greenhouse gases from both the combustion process and the $CO_2$ released from limestone.

Most large-scale vertical market corporations convert limestone to lime in their own facilities. This is driven by two concerns. The first is for the freshness of the lime. From the moment lime is made it wants to convert back to limestone through an exothermic reaction driven by the $CO_2$ in the atmosphere. The second concern is for the purity and the cleanliness of the lime. Lime for medical and consumption markets is typically regulated by requirements for high purity and low levels of contamination, including fuel and combustion products.

Current practice uses modern machinery incorporating waste heat recovery and other optimizations to reduce the quantity of fuel used to create lime. But the principles have not changed, because the heating technologies still use convection heating. As such, efficiencies are low, and no effective production technique has been developed to substantially reduce the $CO_2$ footprint of lime production.

TECHNICAL FIELD

Embodiments of the present disclosure relate to an apparatus and process for thermally processing materials. Specific embodiments relate to heating materials to release carbon dioxide.

BRIEF SUMMARY

The present disclosure describes embodiments of an apparatus and method of thermally processing materials using infrared energy.

In an embodiment, a method for removing carbon dioxide from a material includes introducing the material onto a first segment of a conveyance system comprising the first segment and a second segment that is physically separated from the first segment, heating the material at the first segment for a first time using a first infrared emitter, conveying the material from the first segment to the second segment and heating the material at the second segment for a second time using a second infrared emitter. The material may include a zeolite, limestone ore, or a clinker precursor.

The method may further include performing a first mass measurement of the material on the first segment, performing a second mass measurement of the material on the second segment, setting at least one of a time and a temperature for heating the material on a third segment based on the first and second mass measurements, and conveying the material from the second segment to the third segment.

Conveying the material may include vibrating the first segment and the second segment. The first segment may be above the second segment, and vibrating the material may cause the material to fall from an end of the first segment onto the second segment. The material may be turned over by vibrating the second segment.

In an embodiment, the heating is performed under partial pressure. The partial pressure may be 0.5 atmospheres or less, or 0.2 atmospheres or less.

In an embodiment, the first segment is above the second segment, and conveying the material from the first segment to the second segment includes advancing the material so the material falls from the first segment onto the second segment. The material may be churned as the material falls from the first segment onto the second segment.

In an embodiment, the method includes collecting carbon dioxide released from the material, pressurizing the collected carbon dioxide, and providing at least a portion of the pressurized carbon dioxide to first and second pneumatic drivers to agitate the first and second segments, respectively.

In an embodiment, the first and second segments are within a housing coupled to a vacuum pump, and the method includes collecting the carbon dioxide removed from the material by the vacuum pump, and storing at least a portion of the carbon dioxide collected by the vacuum pump.

One example relates to processing limestone to create lime. In this example, the $CO_2$ content of crushed limestone is measured, and the limestone is moved onto a conveyance segment that is tilted downwards. The segment vibrates while the limestone is being loaded to spread the limestone out over the surface of the segment. After the segment is loaded, it is weighed to measure the mass of the limestone, and the limestone is irradiated with infrared energy.

Continuing with the example, after the first infrared heating cycle, the segment is vibrated again to convey the limestone onto a second segment. The second segment is located below the first segment, so the limestone is churned as it falls onto the second segment, exposing parts of the limestone that may have been covered during the first heating cycle. After the limestone is conveyed onto the second segment, it is weighed again to determine the mass reduction from the first heating cycle. This process is repeated for additional segments until substantially all the $CO_2$ is removed from the limestone, after which the processed material is conveyed along any remaining segments and recovered as processed lime. The limestone can be mixed with other minerals to produce clinker for cement.

The equipment and processes of this disclosure have many advantages over conventional technologies. Some of the advantages are facilitated by using infrared energy to heat the limestone. One of the reasons combustion heating is inefficient is because it uses air to transfer heat. Air is an insulator, so the delivery of heat to limestone using combustion as a heat source takes longer than infrared energy, requiring additional heating time and fuel. Convective transfer spreads in all directions, so a significant portion of the heat in a combustion process is lost to structures around the limestone.

In contrast, infrared energy can be directed towards a target and contained within a structure by using reflective materials. The infrared emitters can be highly directional. For example, most of the infrared radiation can be emitted within an arc of about 45 degrees from the face of the emitters. The emitters can be positioned so that a substantial majority of the energy from the emitters is directed to the limestone, and not lost to surrounding structures.

Another advantage provided by infrared emitters is the ability to process the limestone in a partial pressure environment. Combustion heat sources such as natural gas are not feasible in a partial pressure environment due to the lack of oxygen and the buildup of combustion products. In contrast, the transfer of infrared energy is enhanced in lower pressure environments since the amount of gas that could absorb part of the infrared energy is reduced. Similarly, the amount of heat transferred to surrounding structures by the heated atmosphere is lowered, reducing the total amount of heat lost by the system.

In addition, it takes less energy to release $CO_2$ from limestone at reduced pressures. Reducing the reaction chamber pressure to levels below 1.85 psi absolute can reduce the energy requirement by as much as 25%.

These and other efficiency improvements result in a substantial reduction in the amount of energy required to create clinker or lime from limestone. While conventional processes use 3 million or more BTUs to process a ton of limestone, embodiments of the present disclosure can process a ton of limestone using 600,000 BTUs or less. While conventional limestone processing can take 8 hours, embodiments of the present disclosure can process limestone in 30 minutes or less.

Still another advantage of using lower pressures is the synergy with collecting $CO_2$ from the limestone. The vacuum pump used to achieve the partial pressure will capture the $CO_2$ gas from the process limestone, so the capture of $CO_2$ gas is effectively built into the process. The captured $CO_2$ can be collected and sequestered, or used for an industrial purpose. As noted above, combustion processes are not compatible with partial pressures, so it is much harder to capture $CO_2$ from a conventional process.

Infrared emitters are powered by electricity, which can be provided by a carbon-free source of energy. Accordingly, in combination with the capture and sequestration of $CO_2$ gas, embodiments of the present disclosure can produce lime or clinker using a carbon-free process. No other technologies have this capability.

Some of the embodiments described below are closed loop systems. In closed loop systems, the amount of $CO_2$ released by the limestone is measured at the start and at various stages of the process until the total reduction in mass is the same as the initial mass of $CO_2$. If the process determines that all the $CO_2$ has been released from the limestone before the end of the production line, the limestone can pass along any remaining segments with low or no infrared exposure.

Lime production can be optimized so that the last remaining $CO_2$ is released from the limestone at the final segment, minimizing the amount of energy that would be wasted on over-processing limestone. Continuing to heat lime after the $CO_2$ is released can alter the morphology of the lime, reducing its efficacy for many industries, so closed loop systems can provide a superior product to conventional systems, as well as reducing overall energy consumption. In another embodiment, the mass of material can be weighed periodically until it stabilizes at a base level due to the complete removal of $CO_2$ to minimize over-heating.

In the practice of making clinker, which is ground down to make cement, limestone is typically added to the mix of silica, alumina and certain clays. In a conventional process, this mixture is rotated in a refractory-lined kiln as it is heated by natural gas, coal or coke. At the reaction temperature there is a fusion reaction between the lime and the other clinker constituents.

If 15% to 40% by weight of phosphogypsum is added to the mixture as a catalyst, then the fusion reaction temperature is lowered by approximately 150 to 300° C., reducing the total amount of energy necessary to make clinker and providing a temperature range accessible to a new type of infrared heaters. Methods and apparatuses of the present disclosure are capable of providing combined thermal reactions such as the formation of clinker, where the lime conversion is a component process of a more complex transformation, either serially or simultaneously with the liberation of $CO_2$ from the limestone.

These and other advantages will be apparent to a person of ordinary skill in the art from the following disclosure. Aspects of the present disclosure can be embodied in different ways, having some or all of these and other advantages over conventional limestone processing systems.

A system according to an embodiment of the present disclosure includes a plurality of conveyance segments arranged in series, each segment comprising an infrared emitter directed towards a material bearing surface of the respective segment, each segment including an inlet end and an outlet end, wherein the outlet ends of a portion of the segments are vertically separated from the inlet ends of subsequent segments, and a plurality of vibrators respectively coupled to the segments, the vibrators being configured to convey a material from the inlet end to the outlet end of the segments. The material conveyed from the outlet end may be lime or clinker.

In an embodiment, the system includes a plurality of load cells respectively coupled to the plurality of segments, the load cells being configured to measure a mass of the material on the respective segment. The system may further include a computer configured to control an amount of heat applied to each segment based on mass measurements from the load cells.

In an embodiment, the segments are tubular, and the infrared emitters are disposed in an upper surface of the tubular segments. The outlet ends of the portion of the segments may be disposed inside the inlet ends of the subsequent segments.

In another embodiment, the segments each comprise a floor separated from a cover, and the infrared emitters are disposed in the cover and are oriented towards the floor. The length of the floor may be greater than a length of the cover. The floor of each segment may include a plurality of grooves oriented from the inlet end towards the outlet end of the respective segment.

In an embodiment, the infrared emitters include a metal element embedded in a refractory material. The system may further include a vacuum housing enclosing the plurality of segments and a vacuum pump coupled to the vacuum housing, and a storage tank configured to store carbon dioxide removed from the vacuum housing by the vacuum pump.

The system may further include a first heat exchanger upstream from the vacuum pump that removes heat from evacuated gas and provides the heat to a second heat exchanger configured to heat the material before the material enters the plurality of conveyance segments.

The system may further include a third heat exchanger configured to receive cooled gas removed by the vacuum pump, and to remove heat from the material after it has been conveyed from the outlet end of a final segment.

In an embodiment, a method for removing carbon dioxide from a material includes introducing the material into a conveyance system comprising a first segment and a second segment that is physically separated from the first segment, spreading the material along the first segment by agitating the first segment, heating the material at the first segment for a first time using a first infrared emitter, conveying the material from the first segment to the second segment, and heating the material at the second segment for a second time using a second infrared emitter.

The material may be limestone ore, and the material may be a clinker precursor. The clinker precursor may include phosphogypsum.

The method may further include performing a first mass measurement of the material on the first segment, performing a second mass measurement of the material on the second segment, and setting at least one of a heating time and a temperature for the material on a third segment based on the first and second mass measurements.

Conveying the material may include vibrating the first segment and the second segment. The first segment may be disposed above the second segment, and vibrating the material causes the material to fall from an end of the first segment onto the second segment.

The method may include operating a vacuum pump coupled to the conveyance system, and the heating may be performed under a partial pressure. The partial pressure may be an absolute pressure of 0.5 atmosphere, 0.3 atmospheres, 0.2 atmospheres, or less. The vacuum pump may collect carbon dioxide removed from the material. The method may further include providing the collected carbon dioxide to at least one of a heat exchanger configured to exchange heat with the material and pneumatic drivers respectively configured to drive the first and second segments.

In an embodiment, the carbon dioxide is collected and stored under pressure. The pressurized carbon dioxide may be sequestered or used for another industrial process. The pressurized carbon dioxide removed by the vacuum pump may be used to drive pneumatic drivers coupled to the segments to convey the material.

The method may include measuring an amount of $CO_2$ before the material is introduced into the conveyance system, and measuring a mass of the material after heating to determine amount of $CO_2$ released from the material. The amount of $CO_2$ released from the material may be used to set heating parameters as the material progresses along a plurality of segments.

BRIEF DESCRIPTION OF THE DRAWINGS

The present disclosure can be better understood with reference to the following drawings and description. The components in the figures are not necessarily to scale, emphasis instead being placed upon illustrating the principles of the present disclosure.

FIGS. 5a, 5b and 5c illustrate several views of a support structure.

FIGS. 10a and 10b illustrate an embodiment of a grooved floor of a segment.

FIGS. 11a and 11b illustrate an embodiment of a cover including infrared emitters. FIG. 11b has an inset with a close-up of an emitter, showing a curved infrared-radiating coil.

FIGS. 12a and 12b illustrate an embodiment of a segment including a cover and a floor.

DETAILED DESCRIPTION

Figure 1B:
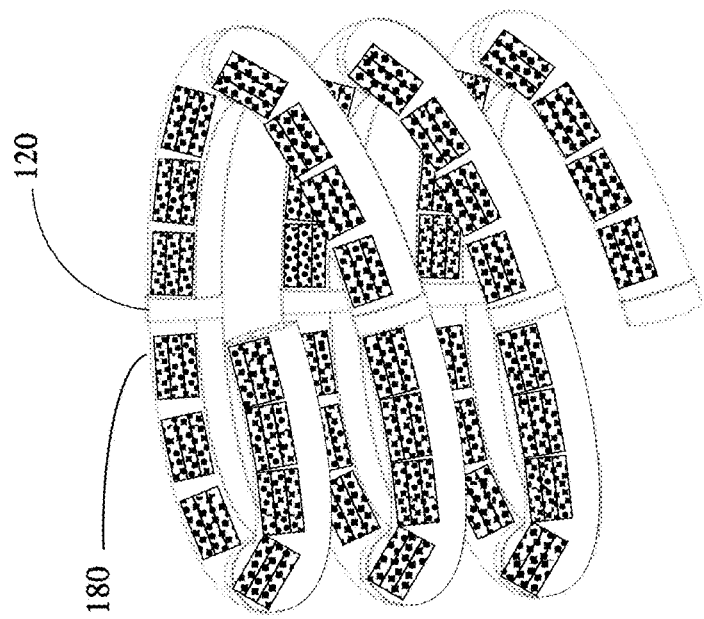
FIG. 1b illustrates an embodiment of a tubular conveyance path isolated from the conveyance system.

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding.

These details are provided for the purpose of example and embodiments may be practiced according to the claims without some or all of these specific details. For the sake of clarity, technical material that is known in the technical fields related to this disclosure has not been described in detail so that the disclosure is not unnecessarily obscured.

The following list provides specific descriptions and examples of items that are present in the embodiments illustrated by the figures. The descriptions in the list are illustrative of specific embodiments, and should not be construed as limiting the scope of this disclosure. Although parts of the discussion below are specific to processing limestone to create lime, it should be recognized that such discussion is only provided to illustrate specific embodiments, and the scope of the present disclosure extends to other thermal processing technologies.

REFERENCE

| Reference Numerals | Description |
| --- | --- |
| 100 | Conveyance system |
| 110 | Conveyance Segment |
| 120 | Joint between two segments 110 |
| 130 | Support arm |
| 140 | Support structure containing load cell, vibratory motion piston boxes, temperature sensors and pressure sensors |
| 150 | Metal conduit column for protecting and passing wiring from support structures 140 to control computer 220 |
| 160 | Input port |
| 170 | Output port |
| 180 | Infrared emitter mounted above and protruding through the top of conveyance system 100 |
| 210 | Vacuum housing |
| 220 | Monitoring/control system |
| 230 | Communications link |
| 300 | $CO_2$ processing system |
| 310 | Material, e.g. limestone powder/granule or clinker components input to system |
| 315 | Analyzer |
| 320 | Pre-processing heat exchanger |
| 330 | Pre-heated limestone powder/granules or clinker components |
| 335 | Input rotary vacuum valve |
| 337 | Vacuum port for removing $CO_2$ |
| 338 | Captured $CO_2$ |
| 340 | $CO_2$ gas heat exchanger |
| 345 | Buffer tank |
| 350 | Vacuum pump |
| 355 | Compressor |
| 360 | Compressed $CO_2$ gas storage |
| 365 | Tanker to transport compressed $CO_2$ |
| 370 | Hot processed material output from system |
| 375 | Post-processing heat exchanger |
| 380 | Cooled processed material |
| 385 | Cooled compressed $CO_2$ gas |
| 390 | Output rotary vacuum valve |
| 395 | Sealed bin for transport and storage |
| 410 | Compression collar |
| 420 | Molding mandrel |
| 430 | Longitudinal grooves in tubular segment 110 |
| 510 | Heat brace |
| 520 | Connecting support/pivot |
| 530 | Load support |
| 540 | Load cell housing |
| 545 | Load cell |
| 550 | Data cable from Load cell |
| 555 | Piston-lifting cylinder |
| 560 | Height adjustment shaft |
| 570 | Height adjustment nut |
| 580 | Ankle attachment/pivot |
| 590 | Mounting plate |
| 595 | Pneumatic feed line |
| 600 | Pneumatic driver assembly |

-continued

| Reference Numerals | Description |
| --- | --- |
| 610 | Piston |
| 620 | Opening in side of piston 610 |
| 630 | Opening in base of piston 610 |
| 640 | Piezoelectric valve |
| 710 | Injection derrick and drill |
| 720 | Ground-level materials to be drilled through |
| 730 | Basaltic rock formation |
| 740 | $CO_2$ mineralizing office and site monitoring |
| 750 | Water tank |
| 760 | Water carbonizing system |
| 900 | Emitter-mounting cover |
| 910 | Space in cover for mounting infrared radiant emitter |
| 920 | Walls of emitter mounting cover |
| 930 | Arc in cover to form circular construction |
| 1000 | Grooved floor of segment |
| 1010 | Groove in floor to help feed material |
| 1020 | Raised section at end of floor |
| 1030 | Arc in floor to match arc in emitter-mounting cover |
| 1100 | Populated emitter-mounting cover |
| 1110 | Infrared radiant emitter |
| 1200 | Quarter-turn segment comprising populated emitter-mounting cover 1100 and grooved floor 1000 |
| 1210 | Input area of the grooved floor 1000, for receiving material 330 |
| 1220 | Output edge of grooved floor 1000, for moving material 330 to next segment 1200 at its input area 1210 |
| 1300 | Full turn segment of apparatus comprising 4 quarter-turn segments 1200 |
| 1400 | Conveyance system with multiple full turns 1300 |
| 1410 | Landing area for input of material 310 to be processed |
| 1420 | Output area for outputting processed material 330 |
| 1500 | Linear segment |
| 1510 | Floor of linear segment |
| 1520 | Raised back |
| 1530 | Sidewalls |
| 1540 | Cover of linear segment |
| 1550 | IR beams oriented to cover floor 1510 without extending past edges of floor |
| 1560 | Grooves in floor of linear segment |

Creating lime from limestone according to embodiments of the present disclosure can use 10% or less of the energy, 10% or less of the footprint, and 10% or less of the time than the best conventional processes in use today. Additionally, embodiments can be configured to release zero $CO_2$ to the atmosphere. Dramatically improved efficiency and zero carbon release is important to many industries including steel, concrete, glass, waste processing, food preparation, paint manufacturing, surgical care, pharmaceuticals, cosmetics, and life support systems for submarines, air and space craft as well as many smaller market applications.

Embodiments of the present disclosure are exceptionally clean and do not allow the processed materials to be contaminated by any fuel or the products of combustion. Further, unlike conventional processes, the material, e.g. limestone, is weighed at each segment of a conveyance path. As the limestone is converted to lime the mass is reduced as the $CO_2$ is released.

Limestone is typically 44% $CO_2$ by weight: for the process disclosed herein, a ratio can be calculated for each batch of raw ore processed. The quantity of $CO_2$ present in the raw ore may be computed from the measured quantity of CaO in the ore, using X-ray reflectometry Laser-induced Breakdown Spectroscopy (LIBS) or a similar technique for species identification and population density estimates. The weight of the material can be measured at each segment, and the difference in weight can be used to control the time and temperature conditions of the process. In this way, the quality of the lime is controlled and damage by excessive heating is minimized.

It is known that the energy required to evolve $CO_2$ from limestone is pressure dependent. Reducing the reaction chamber pressure to levels below 1.85 psi absolute can reduce the energy requirement by as much as 25%, which can be realized as a lower reaction temperature.

Embodiments can produce medical-grade lime at a significant energy reduction compared to current combustion-based kiln processes for separating the $CO_2$ from the calcium oxide in the limestone. Thus, embodiments can make physically better lime with consistent porosity and purer lime with near zero added contaminants, so they are appropriate for use in all existing markets from steel to internal surgery.

This process makes use of existing and novel technologies that provide efficient, highly directive projection of infrared thermal energy in a partial-pressure environment. The use of directed energy and partial pressures is significant as the solids chemistry reaction to remove $CO_2$ from limestone is sensitive to temperature and pressure. By controlling temperature, pressure and time, the reaction can be optimized for energy efficiency and product quality. These process factors are not controllable in any process in use in the industry today.

The basis for exact process control may depend on the purity of the limestone or the ratio of calcium oxide (CaO) to the other constituent minerals in the raw limestone ore. The mass of input limestone ore is divided between CaO and $CO_2$ (typically in a ratio of 56 to 44) and other minerals. Measurement by an analyzer 315 such as an x-ray diffraction device at the input rotary vacuum valve 335 may identify and quantify precise quantities of the constituent materials, and those values may be used by a computer 220 to optimize processing parameters.

Figure 8:
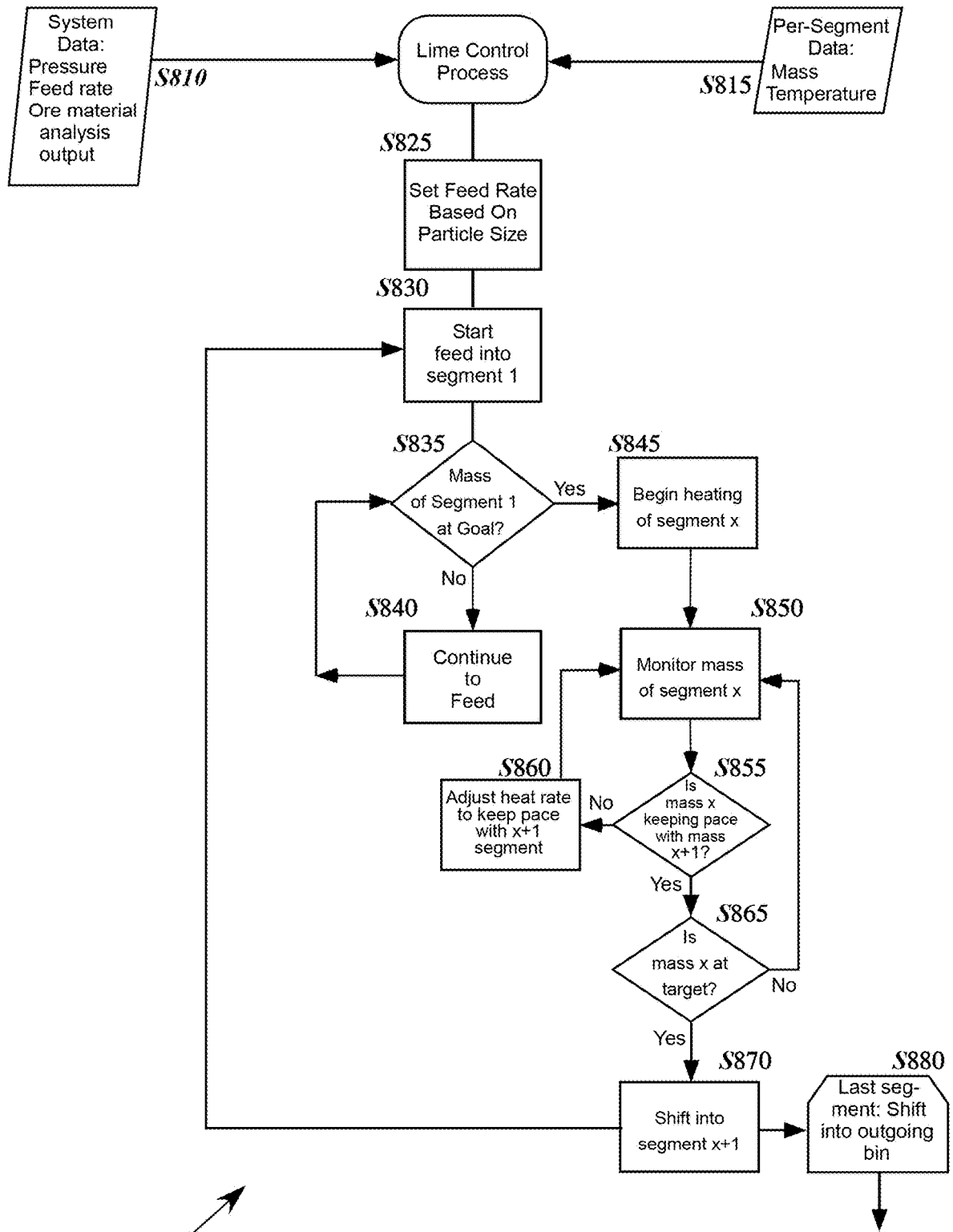
FIG. 8 illustrates an embodiment of a process of controlling a thermal processing system.

As shown in the processing diagram of FIG. 8, this ore material analysis output can be used as an input to the computer control program to determine the ratio of $CO_2$ to the total mass of the raw ore, and to determine by how much the mass of the material should be reduced by heating to ensure complete release of $CO_2$. The material is weighed at intervals during the processing and the thermal energy is adjusted to optimize the process for lowest energy use versus output product quality.

Figure 1A:
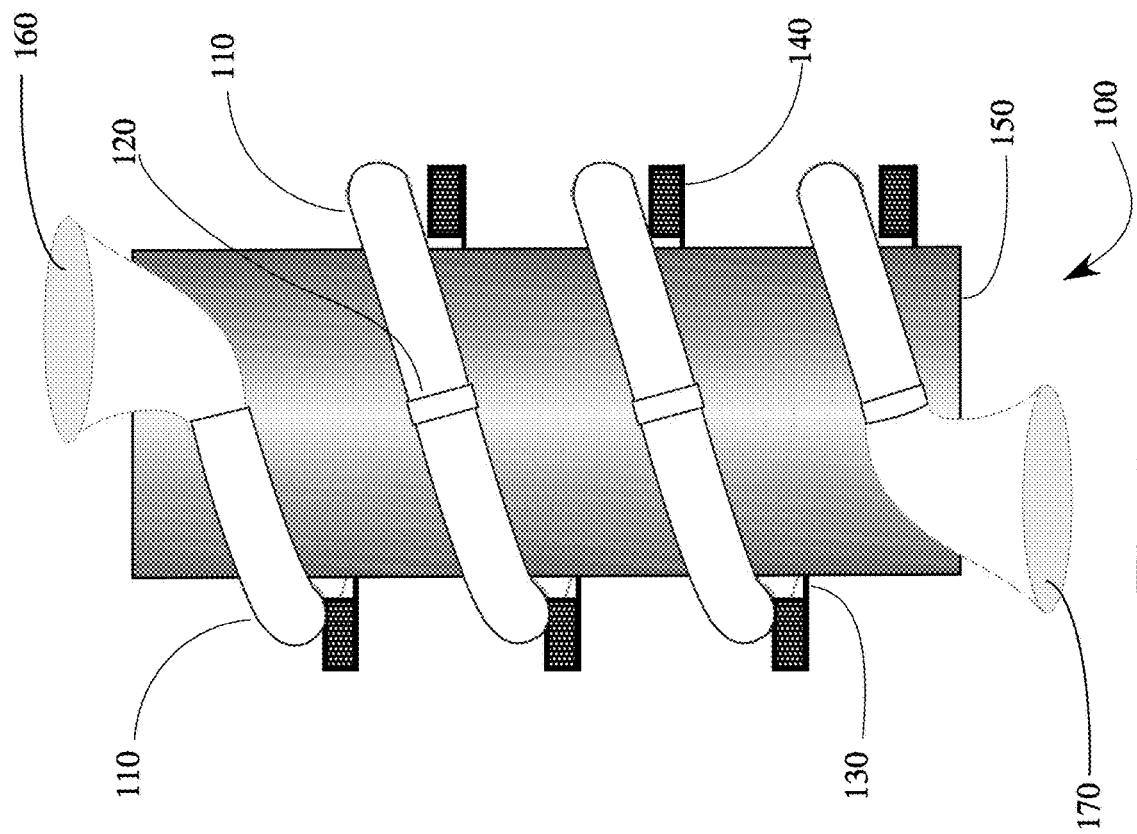
FIG. 1a illustrates an embodiment of a conveyance system.

FIGS. 1a and 1b illustrate a portion of one embodiment of a conveyance system 100 used to direct material such as crushed and milled limestone or milled limestone and other clinker components down a helical-shaped path or tunnel while being exposed to high-power, tunable infrared radiant energy via emitters mounted along the top of the tunnel. FIG. 1a shows a plan view of the helical-shaped conveyance path with a core column 150 and input and output flanges 160 and 170, and FIG. 1b shows an orthogonal view of the helical-shaped conveyance path, oriented so that the emitters 180 mounted on top are visible.

FIGS. 1a and 1b show an embodiment that can manage the flow of relatively small materials such as granules or powders. Examples of the materials that can be used include materials that would pass through a 2.5 cm or smaller sieve. For optimum infrared exposure, the apparatus is designed to efficiently present the surface area of the transported materials to the infrared sources and a metallic surface of the path.

In FIGS. 1a and 1b, the conveyance system 100 includes a plurality of conveyance segments 110 arranged in a helical orientation around a central column 150. In another embodiment, the conveyance system 100 can have a linear orientation, although such an orientation would occupy a larger footprint. In the helical configuration of the figures, each segment 110 extends for about one quarter turn around column 150, but other embodiments are possible.

The conveyance system 100 is configured to use vibratory motion to control the speed of descent of crushed or milled material 310, e.g. limestone, clinker precursors or zeolite, down a plurality of tubular segments 110 along a helical-shaped path while being exposed to infrared radiant energy from infrared emitters 180. The tubular segments 110 may have a smooth lower surface on which the material to be processed rests. In some embodiments, the lower surface of the tubular segments has undulations or a geometry that churns the material as it is conveyed along the segments 110. The material of segments 110 may be a high temperature alloy such as stainless 310, Inconel or a similar material that can resist abrasion from the material and withstand the elevated processing temperatures. The segments 110 may have a ceramic surface, and may include a refractory layer.

The emitters 180 may include a metal material embedded in a ceramic refractory material so that a majority of the infrared energy is emitted within a 45 degree arc from the exposed ceramic surface. In an embodiment, the metal material is a coil with part of the loops of the coil exposed above the surface of the refractory material, and part of the loops embedded within the refractory material. The emitters 180 may be tunable, and may use a conductive material for the coil that can be heated to temperatures in excess of 1500 degrees centigrade.

Examples of the design of the emitters 180 can be found in U.S. Pat. Nos. 10,738,368, 10,718,527 U.S. application Ser. No. 17/003,892 and U.S. application Ser. No. 17/691,024. The emitters 180 may be arranged as single elements or multiple elements, and positioned to irradiate the material on the segments 110 without irradiating sidewalls of the segments. In some embodiments, the coil material may be capable of temperatures up to or above 1500° C.

Each segment 110 of the helix is set on a support structure 140 held in place by its own support arm 130. The vibratory arms 130 extend from the column 150, and wiring for any electrical components contained within the support structure 140 may be routed through the support arms 130 and pass into the column 150.

The support structures 140 may have a void that houses monitoring equipment such as load cells 545 that are configured to measure a mass of material on the segments 110, temperature sensors, and pressure sensors, wiring associated with the monitoring equipment, and vibration motion components. The temperature sensors may be thermocouples that are configured to measure temperature of the segments 110, and the pressure sensors may be configured to measure pressure within the segments. The vibratory motion components can be any pneumatic, hydraulic or electrical vibratory motion device that causes vibration with a frequency and amplitude sufficient to convey a particular grade of material along the segments.

Knowing the mass of the material 330 in each segment 110 enables effective control of the speed of advance of the material 330 and effective control of the infrared emitters 180. Since lime is typically 56% of the mass of limestone, monitoring the mass of the material as it moves from segment to segment, knowing the partial pressure and the temperature as well as the quantity of applied energy to the limestone enables a calculation of the velocity at which the material should be advancing through the system to maximize purity and minimize destructive and wasteful excess heat.

The segments 110 interface with one another at joints 120. As will be explained in further detail with respect to FIGS.

4a and 4b, adjacent segments 110 are spaced apart from one another. The spacing allows the segments 110 to vibrate independently, and facilitates independently measuring the mass of material on each segment 110.

Also shown in FIGS. 1a and 1b are input port 160 and output port 170. The input and output ports 160 and 170 may have a conical shape as seen in the figures, or any other suitable shape to guide material into and out of the series of segments 110.

Figure 2:
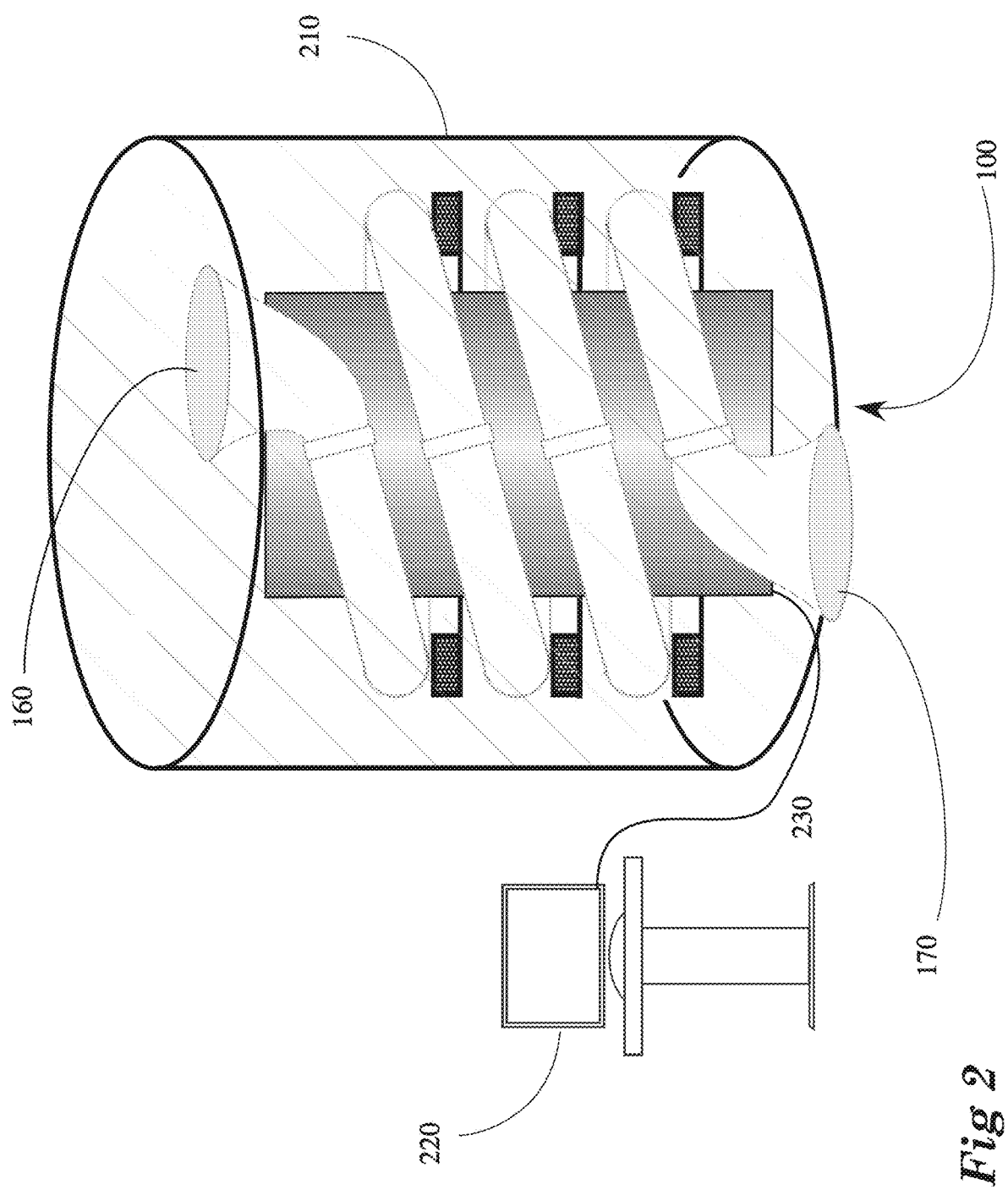
FIG. 2 illustrates an embodiment of a conveyance system and control computer.

As seen in FIG. 2, the segments 110 may be enclosed within a vacuum housing 210. The vacuum housing 210 can be used to provide a partial pressure, which lowers the amount of energy used to evolve $CO_2$ from the limestone. A partial pressure is also useful to minimize contaminants, to reduce the amount of $CO_2$ gas in the environment which could recombine with lime in between heating cycles, or processed lime that is passed along segments without heating, and to reduce convective heat transfer to housing 210 and conduit 150.

A computer device 220 is coupled to the conveyance system 100 by a communication link 230. The computer device 220 has a processor and a memory, and the memory may be a computer-readable medium with instructions stored thereon which, when executed by the processor, cause the computer to perform steps of a method of thermal processing of the materials in conveyance system 100. The communication link 230 may be a wired or wireless link that transmits signals between components of conveyance system 100 and computer 220.

The computer 220 may be configured to adjust the frequency and the amplitude of vibration to control the rate of movement of material 330 in response to a rate of change of the measured mass and the measured temperature of the materials 330 in each segment 110. In addition, the computer 220 may be configured to control dwell times of the material on each segment in an embodiment in which dwell times are used. The computer 220 may be configured to independently control processing parameters for the segments 110.

The control system 220 monitors the temperature and the pressure as it controls the temperature, the pressure and the speed of advancement through conveyance system 100 that houses the materials of the reaction. The state of the solids chemistry reaction is reflected by the mass of the materials 330 held in each segment 110. As the control system 220 monitors the progress and sets the conditions within each segment of the reaction chamber, recognition of the mass of the finished product will cause the control system 220 to move the limestone/lime or clinker components 330 through the system to the exit with no further heating applied.

Computer 220 may control the vibratory pistons 610 and monitor the load cells 545, with data and commands passed through data connector 550 and communications link 230. Additionally, the control system 220 may monitor the partial pressure inside the vacuum chamber 210 housing the conveyance system 100, as well as the temperature of the limestone/lime or clinker components 330 as it is moved down along the chamber walls of the segments 110. The solids chemistry reaction that is the object of the limestone to lime process is influenced by the temperature and the partial pressure of the limestone.

Figure 3:
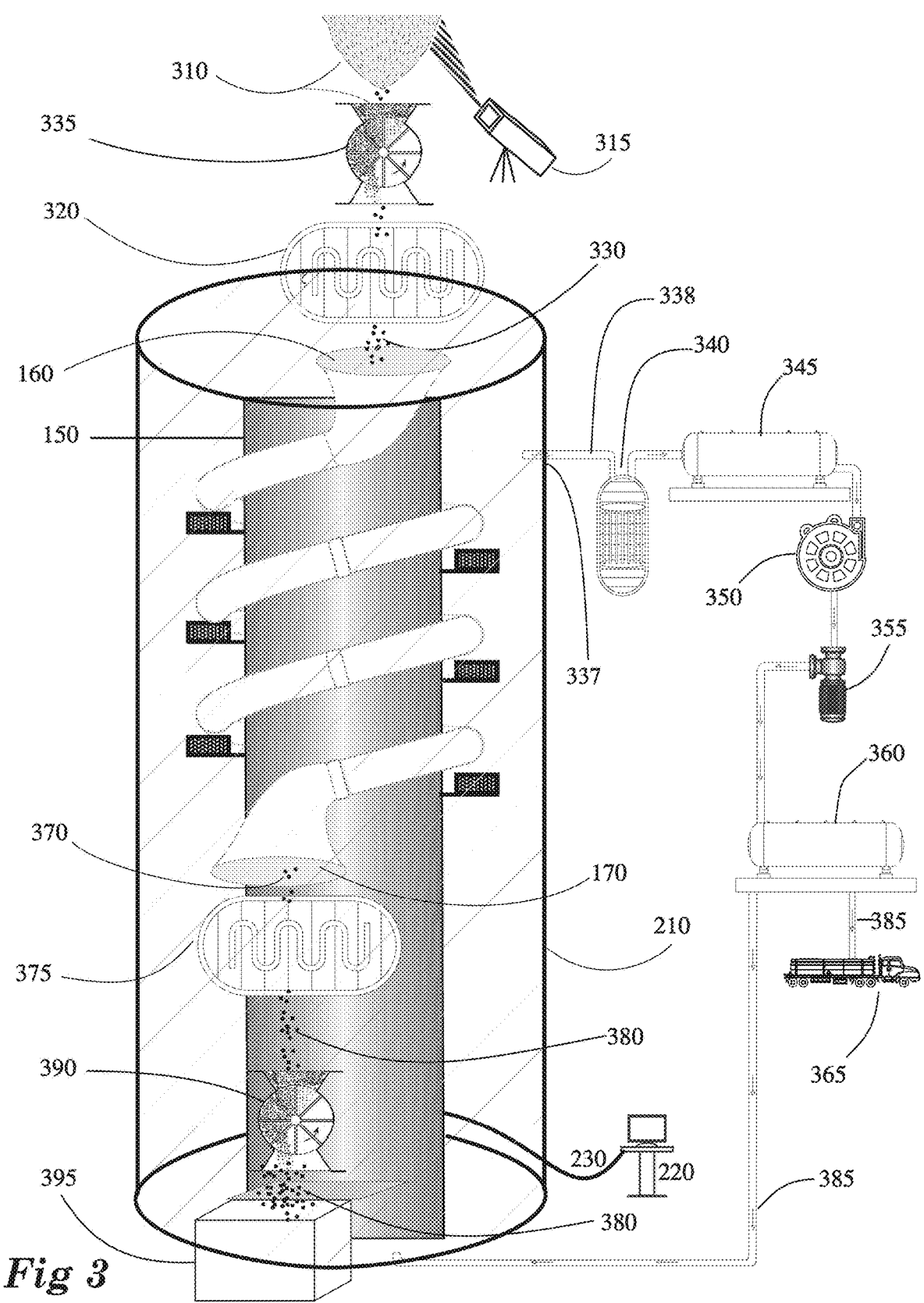
FIG. 3 illustrates an embodiment of a $CO_2$ processing system.

FIG. 3 illustrates an embodiment of a system 300 for processing $CO_2$ from a material 310. The material may be a mineral such as limestone ore or zeolite, a mix of minerals such as clinker percursors, etc. As noted above, the material 310 input into a system 300 with tubular segments 110 may be in the form of a powder or granules. The material 310 may be sieved or graded for consistency before being input into the system 300.

The system 300 includes an analyzer 315 which is configured to analyze the contents of the material 310. Specific examples of the analyzer 315 are an X-ray Diffraction (XRD) analyzer and a Laser-Induced Breakdown Spectroscopy (LIBS) analyzer. The analyzer 310 may be used to determine the molecular and/or elemental content of the material 310. In specific embodiments, the analyzer may be used to determine the amount of $CO_2$ present in the material 310, and that information can be used to optimize the removal process. The material 310 may be analyzed as isolated batches before being introduced into input port 160, or analyzed while being introduced. In an embodiment, a portion of the material 310 is characterized by an analyzer 315 that performs thermogravimetric analysis (TGA) to determine the weight fraction of $CO_2$ that is released by thermal processing.

The material 310 is introduced into the kiln portion of system 300 through an input rotary vacuum valve 335, which may be configured to meter the material while maintaining a partial pressure within housing 210. In particular, the input valve 335 may meter individual batches of material 310 that each occupy a single segment 110 within the kiln. The material 310 passes over a pre-processing heat exchanger 320 that heats the material to become pre-heated material 330, which reduces the amount of heating required to liberate $CO_2$ from the material 330 by infrared emitters 180.

FIG. 3 also shows an external heat exchanger 340 connected to the vacuum chamber for cooling and removing the captured $CO_2$ and to an external compression tank 360 for re-circulating cooled, compressed $CO_2$ back into the vacuum chamber for use in a pneumatic driver assembly 600 and for directing excess $CO_2$ to a compressor 355 for staging into a tank 360 for future transportation. In an embodiment, heat exchanger 375 is thermally coupled to heat exchanger 320 to transfer heat between the exchangers. The heat transfer fluid may be $CO_2$ captured by system 300.

As $CO_2$ is released from the material 330, it passes through a vacuum port 337 disposed in the vacuum housing 210. The released $CO_2$ 338 is put though a gas heat exchanger 340 upstream from vacuum pump 350 to capture the thermal energy and reduce the temperature of the $CO_2$ 338 before it is compressed into the initial buffer tank 345 at a partial pressure. The gas heat exchanger 340 removes the thermal energy from the captured gas 338 and transfers the thermal energy to the input limestone and/or clinker constituents 330 after it has been released from the input rotary vacuum valve 335 as it passes across heat exchanger 320. Accordingly, gas heat exchanger 340 is coupled to input heat exchanger 320, and this heat loop recycles heat that would otherwise be lost.

A vacuum pump 350, e.g. a liquid ring vacuum pump, draws the $CO_2$ 338 through the heat exchanger 340 and into a buffer tank 345 creating a working vacuum or partial pressure inside the reaction chamber. The absolute pressure of the partial pressure within vacuum housing 210 may be, for example, 0.5 atmospheres or less, 0.4 atmospheres or less, 0.3 atmospheres or less, 0.2 atmospheres or less, or 0.1 atmospheres or less.

A $CO_2$ compressor 355 accepts the low positive pressure from the buffer tank 345 and pressurizes the $CO_2$ into the storage tank 360 to pressures that can be, for example, between 10 and 40 atmospheres. The storage tank 360 is a collection distribution tank for a waiting transport 365 to move the $CO_2$ to a remote site for disposal or reuse.

A portion of the cooled and compressed $CO_2$ 385 can be used as a refrigerant in heat exchanger 375 to cool the processed material 380 before passing through output rotary valve 390, where the pressure is reduced to absorb the excess thermal energy of the processed material 380. Additionally, a portion of the cooled output $CO_2$ 385 can be used as a pneumatic fluid to drive a vibratory mechanism such as a pneumatic driver assembly 600 that moves the material 330 along the segments 110.

The output rotary vacuum valve 390 meters the cooled material 380 output from the advanced technology kiln, and the processed material 380 is stored in a sealed bin 395 for storage and transport. In some embodiments for vertical industries, the processed material 380 may be provided directly to another process without being stored.

Figure 4B:
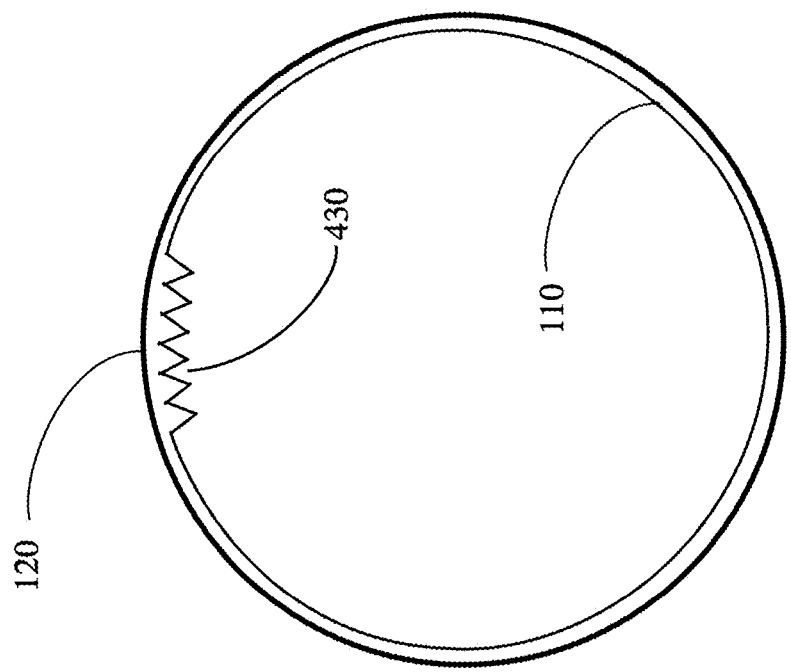
FIG. 4b illustrates an embodiment of an interface between a compressed tubular segment and an adjacent segment.
Figure 4A:
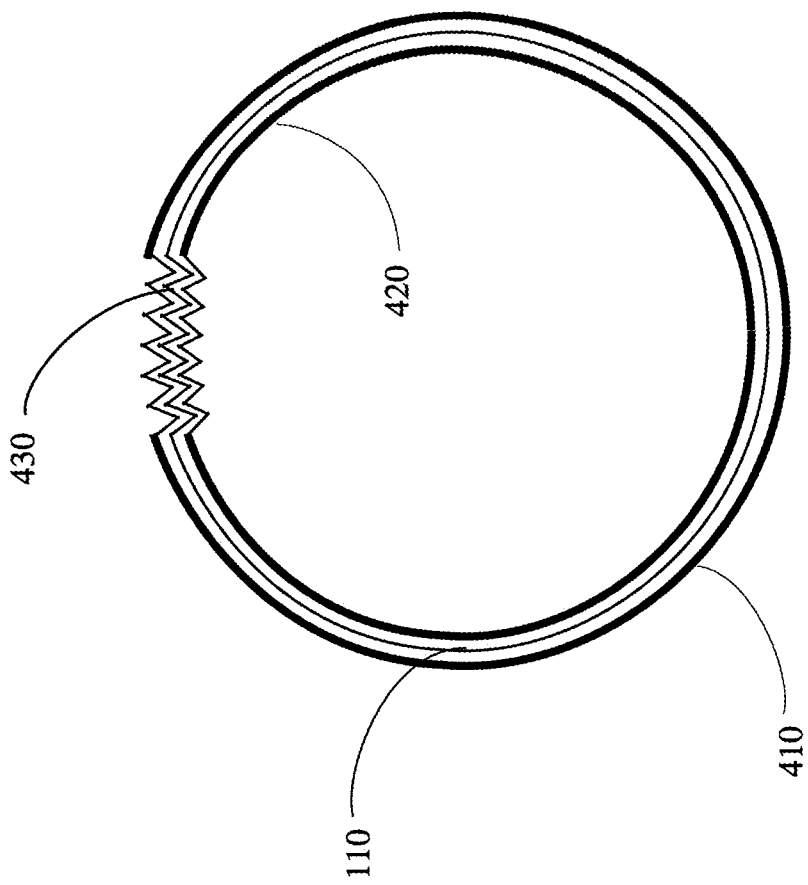
FIG. 4a illustrates an embodiment of a compression mechanism for compressing a tubular segment.

FIG. 4a illustrates an embodiment of an assembly for compressing ends of tubes used to form the segments 110 of the tunnel in order to fit the ends into the opening of the next segment 110 in the tunnel at joints 120. This cross-sectional view of the compression assembly shows tube walls of a segment 110 compressed between an outer collar 410 and an inner mandrel 420 to create longitudinal grooves that effectively reduce the circumference of the metal tube.

FIG. 4b shows an embodiment of the compressed tube end of a segment 110 seated within the circumference of the open end of the next tube to form a non-contact joint between two segments 110 of the tunnel. The longitudinal grooves 430 of the top of the leading edge of the segment 110 shrink the diameter of the tube so that the upper segment can fit into the lower segment far enough so that as the material 330 moves out of one segment 110, the material 330 will fall inside the confines of the next or lower segment 110, providing a conveyance path across joints 120 that does not trap material as it is conveyed between segments.

An inner diameter of the tubes of segments 110 may be on the order of 20 to 40 centimeters, for example, but the exact dimensions can vary depending on the application. Exposed portions of the outer diameter of tubular segments 110 may be wrapped with an insulating refractory material.

In the embodiment illustrated in FIG. 4b, the segments 110 do not physically touch: the exit of one segment is nested inside the entrance to the next segment 110 at joint 120, but the difference in the circumferential diameters provides a gap between the two so that they do not interfere with the vibration of each other. The segments 110 may vibrate at different frequencies and amplitudes, as well as at different times. The range of frequencies may be from a tenth of a hertz to ten cycles per second, for example. An example of the range of amplitudes is between one millimeter to three centimeters or more, and the space between overlapping segments 110 at joints 120 may be sufficient to accommodate the simultaneous vibration of both overlapping segments.

When a gap is present, thermal expansion characteristics are not a significant factor in the physical construction of the joint 120. Instead, the segments 110 are each mounted independently and may have their own infrared emitters 180, sensors and vibratory subsystems.

Embodiments are not limited to the configuration shown in FIGS. 4a and 4b. In other embodiments, segments 110 may be physically joined at joints 120, e.g. by a compression fit, and the joined segments 110 may be vibrated in unison. It is possible for some segments 110 to be joined, and other segments to interface in a non-contact fashion as shown in FIG. 4b. Contact joints reduce the amount of control that can be applied to measure the material 330 and adjust parameters to optimize processing.

FIGS. 5a, 5b and 5c illustrate several views of an embodiment of a five-axis support structure 140 for positioning segments 110 and housing the load cells 545 and piston-lifting cylinder 555 of a piston assembly 600 coupled to the support arms 130 pictured in FIG. 1a. FIG. 5a is a front elevation view, and FIG. 5b shows a side elevation view showing a load cell 545, load cell attachment components and piston-lifting cylinder 555. The inset of FIG. 5b is a magnified view with the load cell component 545 removed. FIG. 5c shows a top perspective view of the support structure 140.

The support structure 140 includes a lower mounting plate 590 that is coupled to a support arm 130 and an upper mounting plate 590 that is coupled to a segment 110. The mounting plates 590 are supported by heat braces 510. The position of the upper plate 590 with respect to the lower mounting plate 590 can be adjusted by adjusting support pivot 520, height adjustment nut 570, and pivot 580.

The support structure 140 includes a load cell 545 that is configured to measure the mass of material on a segment 110 and a pneumatic driver assembly 600 that vibrates the segment 110. The pneumatic driver assembly 600 is mounted concentrically with the load cell 545. A data cable 550 runs from the support structure 140, and may carry signals from the load cell 545, thermocouples, pressure sensors, accelerometers, or other sensory devices integrated with the support structure 140 or segments 110.

Figure 6C:
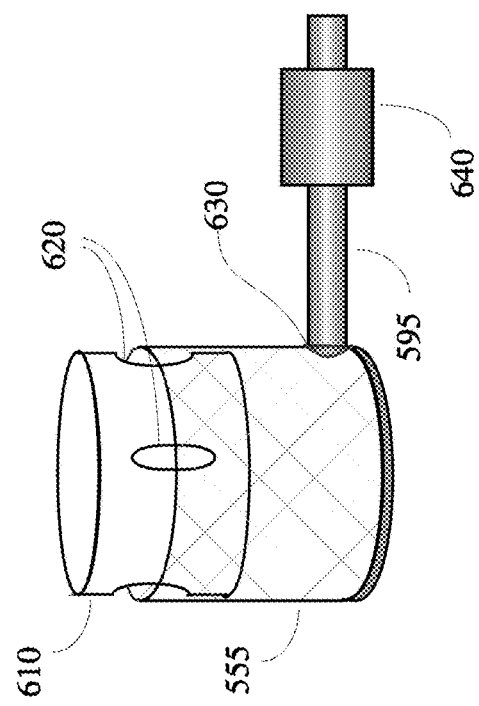
FIGS. 6b, 6c and 6d illustrate views of a pneumatic driver.
Figure 6D:
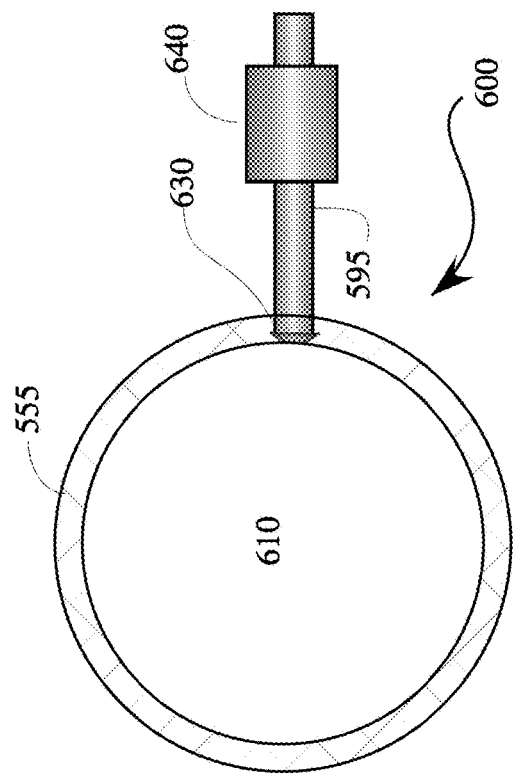
Figure 6A:
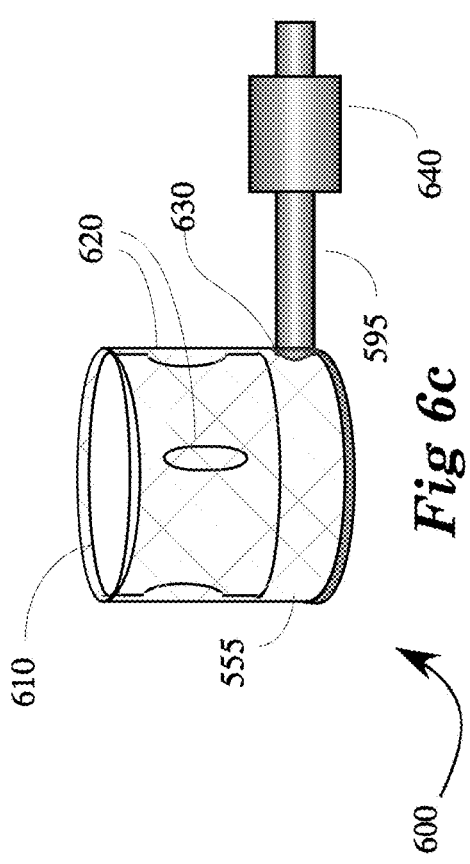
FIG. 6a illustrates an embodiment of a piston of a pneumatic driver.
Figure 6B:
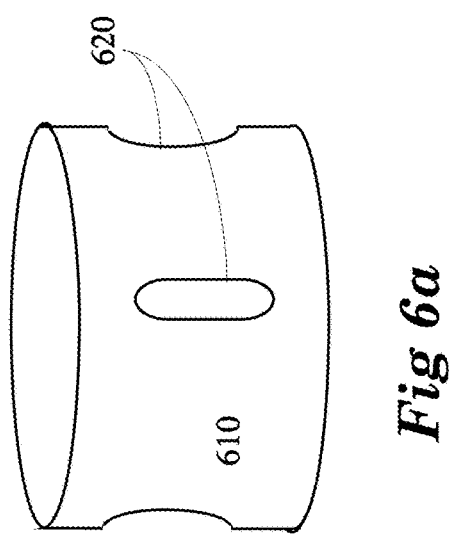

FIGS. 6a, 6b, 6c and 6d illustrate an embodiment of a pneumatic driver assembly 600 that is used to vibrate segments 110 to convey material 330. As seen in FIG. 6a, the piston 610 of the pneumatic driver assembly 600 includes a plurality of openings 620 in sidewalls of the piston 610. As seen in FIG. 6b, a top plan view of the pneumatic driver assembly 600, the piston 610 is concentrically housed within a piston-lifting cylinder 555, wherein the piston-lifting cylinder 555 is open at the top and closed at the base.

FIGS. 6c and 6d illustrate two different positions of the pneumatic piston assembly 600-FIG. 6c illustrates the down or collapsed position in which the piston 610 is at rest within the tubular bore of the piston-lifting cylinder 555, and FIG. 6d illustrates the up or extended position in which the piston 610 is pushed out of its bore by the action of a pneumatic fluid such as compressed $CO_2$ to lift a segment 110.

A piston 610 in its piston-lifting cylinder 555, positioned in a support structure 140 and mounted upon a support arm 130, lifts and drops segments 110 such that the segments 110 act as vibratory conveyors to convey material 330 towards outlet 170. In the embodiment shown in FIGS. 6a-6d, the pneumatic driver assemblies 600 are a total loss system, in that as piston 610 is lifted out of a bore in its piston-lifting cylinder 555, the piston 610 reveals openings 620 which are gas channels that release a driving gas (e.g., compressed $CO_2$) to the vacuum chamber 210 interior. In this embodiment, the base of piston 610 is open and the top surface is closed.

The released gas is subsequently removed along with the $CO_2$ 338 that is released by heating the material 330. The weight of the segment 110 and the material 330 then pushes the piston 610 back inside its bore where pressure can be controlled by a piezoelectric valve 640 to determine how soon the piston 610 will push up and out of its bore on the next cycle.

The base of the piston-lifting cylinder 555 may have one or more opening 630 through which one or more pneumatic feed line 595 from the piezoelectric valve 640 are run to control the flow of pneumatic fluid which lifts the piston out of the lifting cylinder 555. The top surface of piston 610 accepts force from the pneumatic fluid to apply pressure to the piston 610, and when the openings 620 move above the top of piston-lifting cylinder 555, the pneumatic fluid is released. The size of openings 620 and 630 and fluid pressure may be adapted to vary action of the piston, e.g. activation velocity and decay.

Pressurized pneumatic fluid may be applied to the pistons 610 in pulses by operating a mechanical device such as a piezoelectric valve 640 to control the release of pressurized pneumatic fluid. The piezoelectric valve may be disposed within conduit 150 or within a cavity in a support arm 130, and the pneumatic feed line 595 may be routed along the support arm 130 to the associated piston-lifting cylinder 555. The fluid may be supplied to the pneumatic driver assembly 600 through a hole in the base of mounting plate 590, for example. In an embodiment, the path of the pneumatic fluid along the support arms 130 is configured to cool the vibratory arms using the pneumatic fluid. This can be accomplished, for example, by routing the pneumatic fluid through a fluid path provided within the support arms 130 to allow heat to transfer from the arms to the fluid.

Other embodiments may have a vibrator that is different than the pneumatic driver assembly 600 shown in FIGS. 6a-c. For example, another embodiment may use a different type of linear vibrator, a rotational vibrator with an eccentric driver, etc. In still another embodiment, vibrational displacement may be provided by moving the support arms 130, for example by raising and lowering the arms about a hinge.

In an embodiment, the pneumatic piston 610 is driven by the cooled and compressed $CO_2$ 385 to independently lift each segment 110 while the material 330 is being heated or in between heating cycles. Each segment 110 is independently lifted and dropped by one or more piston 610 housed in a support structure 140 that is held up by support arm 130, which is coupled to central column 150. This lifting and dropping motion uses gravity to shift the material 330 down the conveyance system 100 from the input 160 at the top to the outlet 170.

When the segments 110 are controlled individually, a software command can be used to empty a segment 110 of material 330 or empty all segments 110 in the conveyance system 100. When the piston 610 is at rest, the load or weight of the segment 110 plus the material 330 is supported by the load cell 545 enabling the computer 220 to determine the mass of material 330 in the segment 110. When measurements from several segments 110 are taken together, knowing the heating history of the previous segments, the progress of the solid chemistry reaction can be calculated by the computer 220.

Information related to the progress can be used to control the amount of heating applied to material 330 to reduce over-heating the material. In addition to reducing energy use, over-heating lime can result in reduced porosity which makes the lime less reactive.

$CO_2$ released by the material 330 may be moved transported to a separate location where it is stored, sequestered, or used by another industrial process. In one example, the $CO_2$ is sequestered using a mineralization process.

Figure 7:
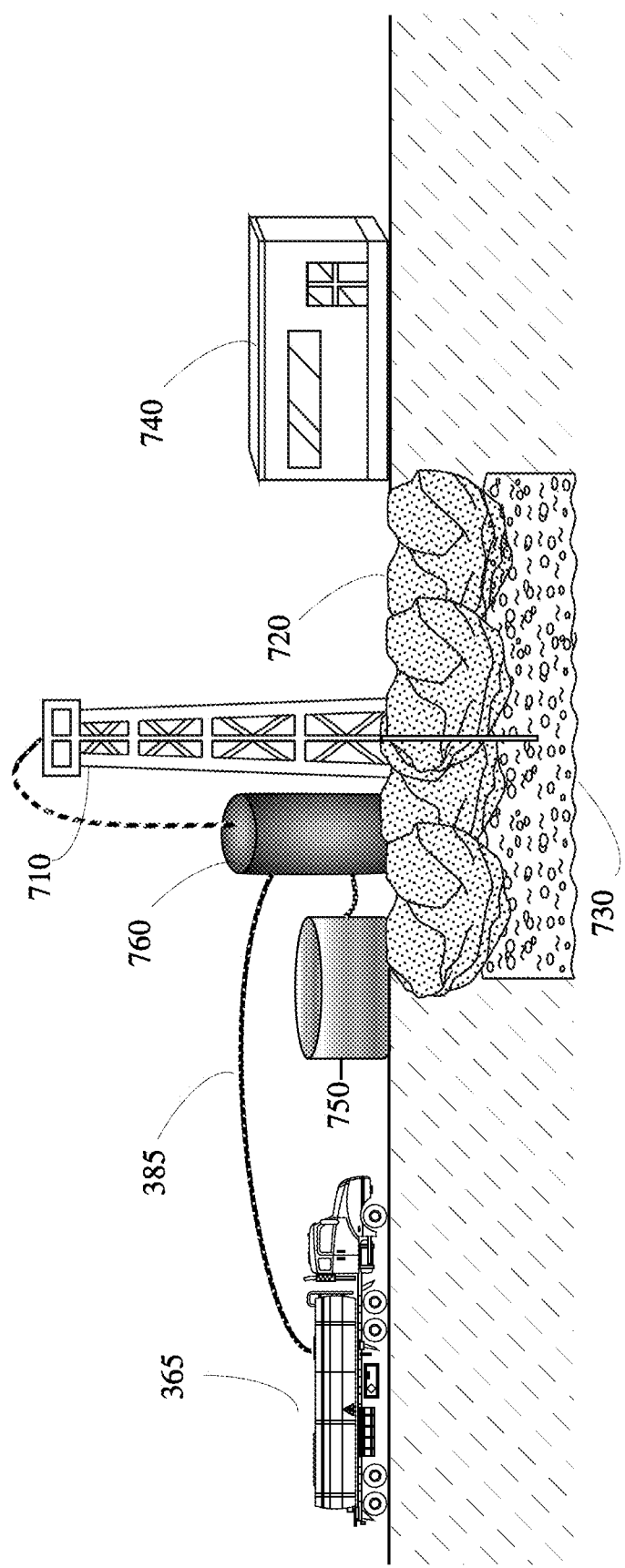
FIG. 7 illustrates an embodiment of $CO_2$ carbon sequestration.

FIG. 7 illustrates a mineralization site where the $CO_2$ 385 is combined with water and injected into a basaltic rock where it mineralizes as rock formations such as calcite ($CaCO_3$), magnesite ($MgCO_3$) or dolomite ($CaMg(CO_3)_2$), depending on the composition of the basaltic rock. The $CO_2$ is transported under pressure and moved to the mineralization site by a transport 365.

At the site, the residual pressure of the transported $CO_2$ is used to mix the $CO_2$ with water from water tank 750 to create carbonated water using water carbonizing system 760. The carbonated water is forced by a derrick 710 through ground level materials 720 and into basaltic rock 730 beneath the surface. The mineralization process is relatively quick involving hours and not weeks of reaction time.

FIG. 8 shows an embodiment of a control process 800 for controlling a thermal processing system 300. Process 800 may be performed by the computer 220.

The process 800 receives system data at S810. The system data may include pressure within the vacuum housing 210 from one or more pressure sensor, feed rate, and material properties from analyzer 315. The pressure measurements can be used to adjust vacuum pump 355 to maintain a target pressure within the housing 210. The feed rate can be derived from mass measurements over time, and can be used to adjust vibration parameters to achieve a feed rate at which substantially all the $CO_2$ is released from the material by the time it is conveyed to the output port 170. In another embodiment, feed rate can be measured more directly using an optical technique to directly measure the rate at which material moves along the segments 110.

The material properties can be used to predict when substantially all $CO_2$ will be released from the material based on mass measurements at S815, and can be used to adjust feed rate, temperature and pressure to optimize the process. If substantially all the $CO_2$ is released before the final segment 110, the material can be passed along any remaining segments with no or minimal heating from the infrared emitters 180.

Data from individual segments is input at S815. The data from individual segments includes mass measurements and temperature measurements for each segment 110, and could include other data as well, such as accelerometer data to determine an amount of vibration. These data can be used to set time, temperature and vibration parameters for each segment 110.

The initial feed rate of the material may be set at S825 based on the particle size of the material. The rate of $CO_2$ release varies according to particle size, where smaller particle sizes have a greater surface area and will release faster than larger particle sizes. Other factors could be used to set the feed rate at S825 such as $CO_2$ content, material type, etc.

Material is fed onto the first or uppermost segment 110 at S830. The amount material fed onto the segment is measured at S835, for example by pausing vibration and feeding and taking a measurement with a load cell 545. In another embodiment, an amount of material is metered as it is being fed onto the segment 110, e.g. by a gravimetric or volumetric feeder which can use an auger feed or similar mechanism to meter the material. When the material being made is clinker, the clinker components may be fed onto segment 110 by a gravimetric blender or as a pre-mixed material.

Heat is applied to the material on the first segment in the form of infrared energy from emitters 180 at S845. In some embodiments, the material is heated during a dwell cycle in which no vibration is applied to the material, and mass measurements can be taken during or after the dwell cycle at S850. When mass measurements are taken during a dwell cycle, the measurements can be used to measure the rate at which $CO_2$ is released. The material may also be heated while it is conveyed along the segments 110, and vibration may be paused to measure the mass at S850.

The computer 220 may compare the mass of material on one segment (segment x) to the mass of material on the next segment (segment x+1) to determine whether the two masses are being processed at the same rate at 5855. The heating rate of the mass on segment x may be adjusted at S860, e.g. by changing the heating temperature or time, so that the material on each segment 110 is processed at about the same rate.

The system can determine whether material on a segment 110 has reached a target weight at S865. The target weight may be the weight of the material that is expected at each segment 110 to ensure that the material is fully processed by the time it arrives at the outlet 170. Additional heat may be applied to the material until it reaches its target mass at S865, after which it is conveyed to the next segment at S870. After it reaches the last segment 110, the material is conveyed out the outlet 170 and into a sealed container 395.

Other variations of control process 800 are possible. For example, in some embodiments, the material is continuously fed and heated as it is conveyed along conveyance system 100. In such an embodiment, measurements such as temperature and $CO_2$ levels (by a $CO_2$ sensor) could be used to adjust variables such as temperature and velocity (as a function of vibration) to ensure that most or all the $CO_2$ is removed from the material without excessive heating. Continuous feeding is more feasible for a process in which the material is highly consistent in both size and content. When size and/or content of material is inconsistent, a continuous process is likely to result in under or over processed material.

Another embodiment of segments in a conveyance system 1400 is illustrated in FIGS. 9 to 14. In this embodiment, a plurality of quarter-turn segments 1200, each comprising an emitter-mounting cover 900, populated with emitters 1110 and a grooved floor 1000, are constructed so that they form a continuous, but not connected, helical path. The embodiment shown in FIG. 9*a* has 27 emitters 1110, but other embodiments may have a larger or smaller number of emitters 1110.

Figure 9B:
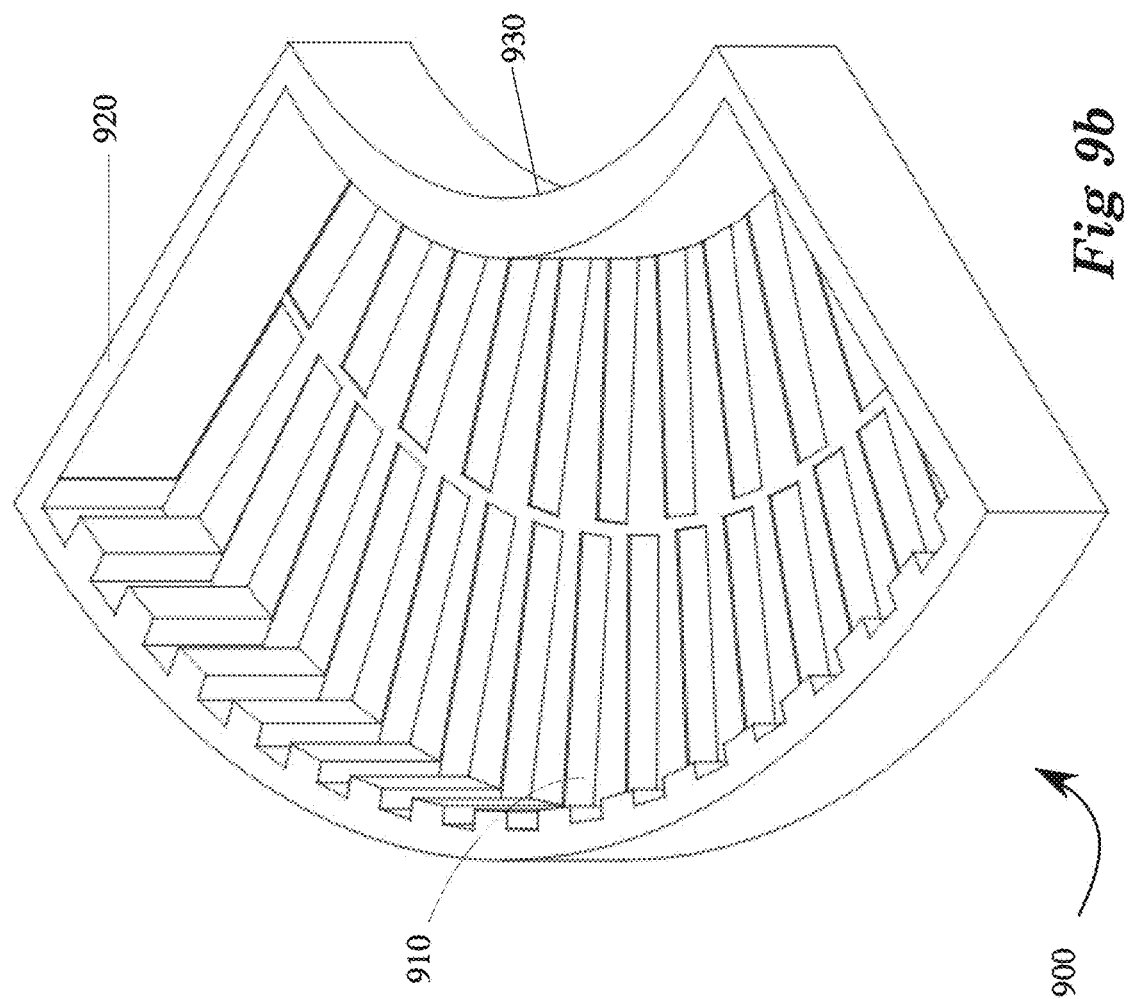
FIGS. 9a and 9b illustrate an embodiment of a cover of a segment.
Figure 9A:
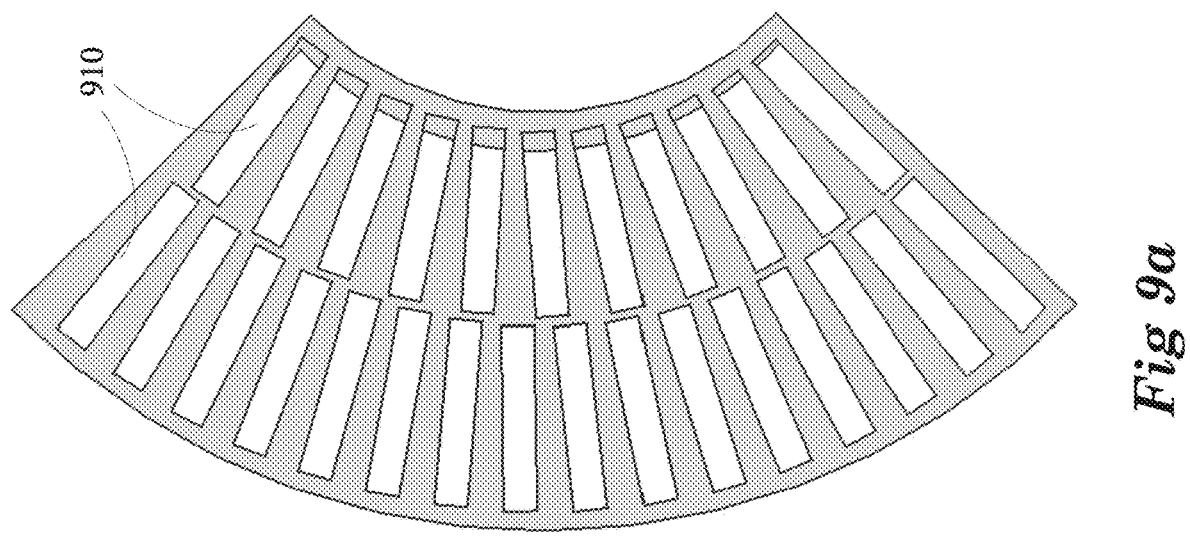

FIGS. 9*a* and 9*b* show views of an embodiment of a cover 900 for mounting emitters to irradiate a quarter-turn section of a segment 1200. FIG. 9*a* is a plan view of the cover 900, showing empty holes 910 for housing emitters, and FIG. 9*b* is an orthogonal view showing walls 930 of the cover 900.

FIGS. 10*a* and 10*b* are views of an embodiment of a grooved floor 1000 of a segment 1200 in the second embodiment. FIG. 10*a* is a plan view of the grooved floor 1000, showing a quarter turn arc 1030 for a conveyance system 100 in which segments 1200 are arranged in a helical orientation. FIG. 10*b* is an orthogonal view of the grooved floor 1000, showing the grooves 1010 of the floor as well as a raised edge 1020 for retaining the material as it falls onto the floor 1000. Although not shown in the figures, the floor 1010 may have sidewalls that prevent material from falling off the sides.

FIGS. 11*a* and 11*b* are views of the emitter-mounting cover 900 with emitters 1110 populating the holes. FIG. 11*a* is a top plan view showing the non-radiant side of the emitter, which is the top side in assembly. FIG. 11*b* is a bottom plan view, showing the radiant side of the emitters 1110 which face the material on floor 1000.

FIGS. 12*a* and 12*b* show two views of a combined emitter-mounting cover 1100 and grooved floor 1000 of a segment 1200. FIG. 12*a* is a plan view showing the relative horizontal position of the cover 1100 over the floor 1000, and FIG. 12*b* is an orthogonal view to show the relative vertical positions of the cover 1100 and floor 1000.

As seen in FIG. 12*a*, the cover 1100 of each segment 1200 extends for a shorter distance than the floor 1000, so that input and output ends of the floor 1000 are not covered by the cover 1100. In an embodiment in which the segments 1200 are about a quarter turn of an arc, the cover 1100 may have an arc length that is at least 5% or at least 10% less than an arc length of the floor 1000. The shorter length of the cover 1100 avoids wasting infrared energy from emitters that are disposed at the ends of the cover, which would otherwise emit radiation onto parts of the floor 1000 that are not occupied by material or onto adjacent segments 1200.

The unprocessed material 310 is dropped onto the loading area 1410 of the apparatus. As the partially processed material 330 reaches the desired weight in each segment, the vibratory apparatus moves it along from the output edge 1220 of the quarter-turn segment 1200 to the input area 1210 of the next lower quarter-turn segment 1200. As with the first embodiment, the segments 1200 need not be precisely a quarter-turn in length, and they can be arranged in a linear path instead of a helical path. A helical path system may have 10 or less total turns.

Each segment 1200 may be heated and controlled separately. The process may be controlled by a computer 220 using control process 800 based on the measured weight of the material being processed, with time and energy inputs calculated based on the ratio of the $CO_2$ in the input material.

In some embodiments, the material may occupy less than the full length of a segment 1200, e.g. about ⅔ of the length of a segment 1200, for a heating cycle. In such an embodiment, material is conveyed in discrete batches that can be tracked and processed individually, and processing parameters can be adapted to provide different heating parameters for each batch.

The vibration of each segment 1200 is isolated from surrounding segments 1200 by the vertical distance between each adjacent segment 1200. The material 330 being processed is moved along and heated in each segment 1200, until it reaches the final segment 1200 and is output from area 1420 to the post-processing area.

The segments 1200 may have a convex portion in the middle to retain material 330 in the segments 1200 and reduce the chance that portions of a batch of material on one segment 1200 are mixed into a batch on the next segment 1200 while the material is being conveyed. In another embodiment, a lip is provided at the end of a segment 1200.

Figure 13:
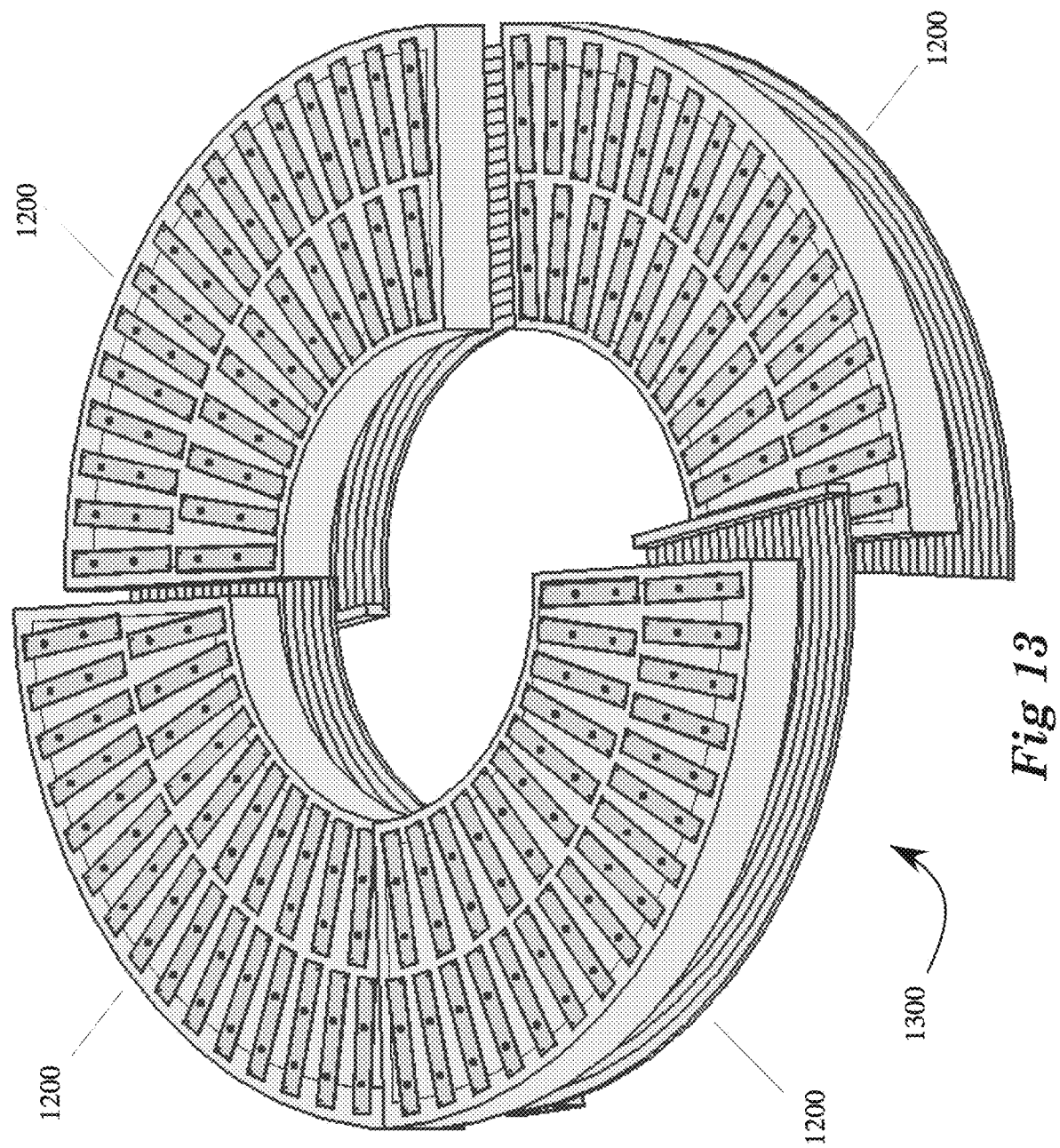
FIG. 13 illustrates an embodiment of one full turn of segments.

FIG. 13 is an orthogonal view of one embodiment of four quarter-turn cover/floor segments 1200 to make one full turn of a material heating and moving apparatus. Each quarter-turn segment 1200 is tilted and placed vertically below the previous segment 1200 to facilitate the movement of the material from one quarter-turn segment to the next.

Figure 14:
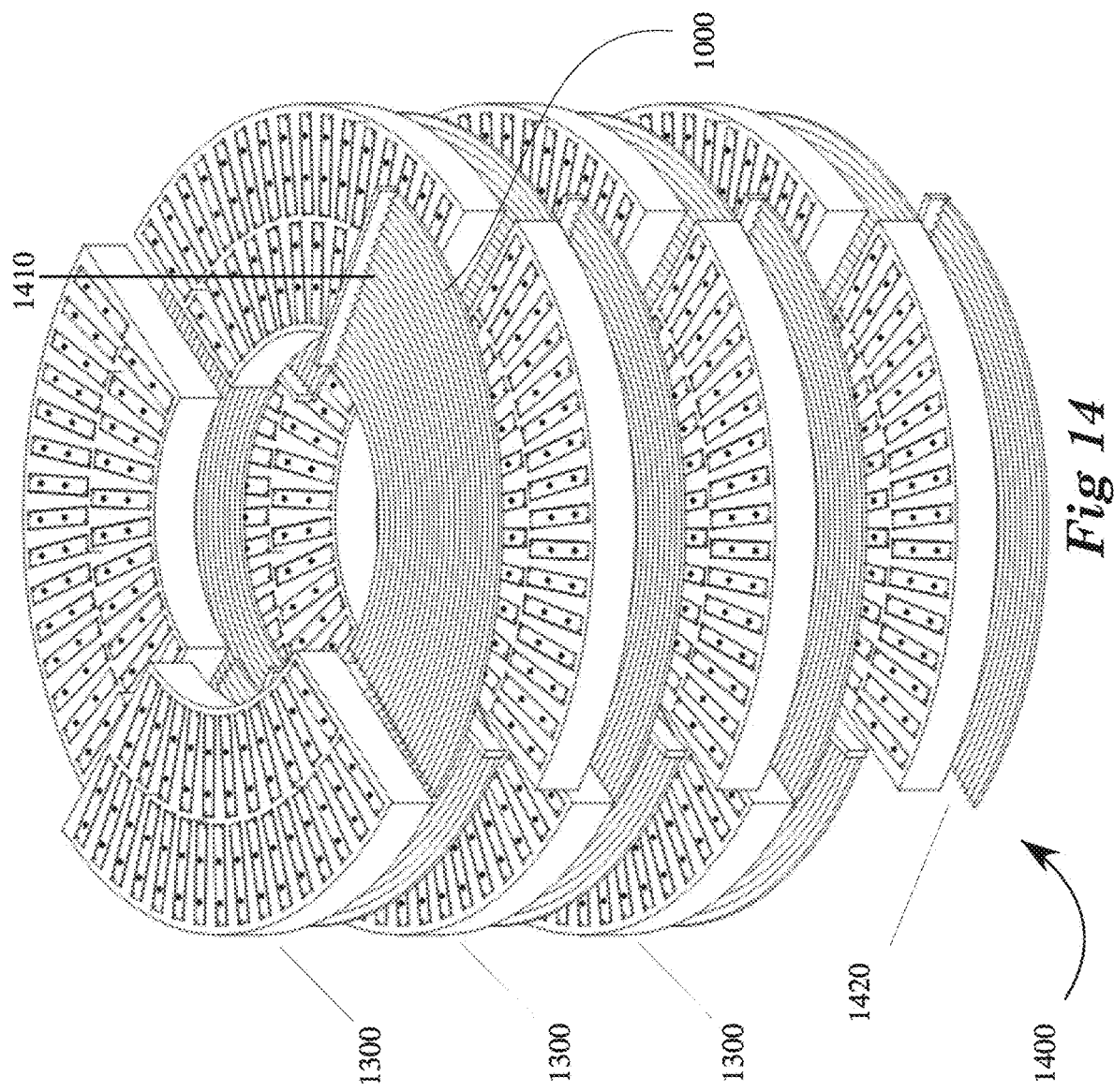
FIG. 14 illustrates an embodiment of several full turns of segments in a helical conveyance system.

FIG. 14 is an orthogonal view of an embodiment of a conveyance system 1400 with multiple full turns of segments 1200. As many full-turn sections can be used as appropriate to expose material to sufficient heat to remove substantially all the $CO_2$ from the material.

A system 300 may comprise flat segments 1200 or tubular segments 110 as described above. That is, the segments 1200 of the second embodiment may be provided in a system 300 that has all the components of system 300 explained above with respect to FIG. 3.

A conveyance system 1400 with flat segments 1200 is suitable for processing relatively large pieces of limestone, e.g. pieces on the order of tens of centimeters in diameter. While the tubular elements of conveyance system 100 are well suited for processing material 330 in the form of powder or granules, conveyance system 1400 can process limestone in the form of rocks and gravel. The grooves 1010 can have a depth of a few centimeters to tens of centimeters to channel rocks and gravel around the turns while keeping the rocks and gravel on the segments 1200.

In an embodiment, conveyance between segments 1200 may be aided by tipping the segments. This may be accomplished by providing two support arms 130 for each segment 1200 and raising the support arm 130 on the landing site 1410 side by activating a pneumatic cylinder, for example. Tipping may be performed in addition to vibration to convey the material 330.

Figure 15:
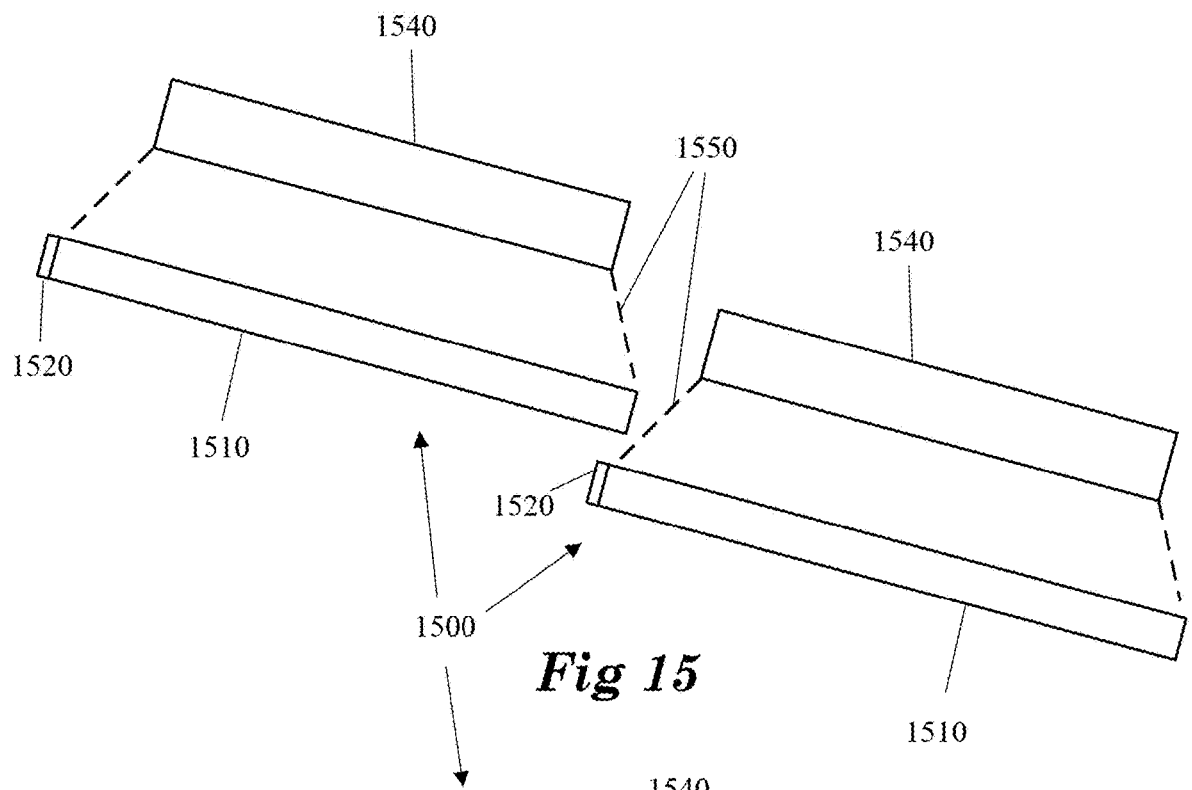
FIG. 15 illustrates an embodiment of two adjacent linear segments.

FIG. 15 illustrates an embodiment of two segments 1510 of a conveyance system with a linear orientation. A floor 1510 of a first segment 1500 is positioned above a floor 1510 of a second segment 1500 so that the front end of the first segment vertically overlaps with the back end of the second segment 1500. The segments 1500 are canted downwards from back to front so that material on the floor 1510 moves down towards the next segments 1500 when vibrated. The vertical distance between the segments 1500 is sufficient to allow both segments to vibrate simultaneously without touching. Another advantage of the vertical separation between segments 1500 is that material will change orientation when it falls from one segment to a subsequent segment, turning the material over so it is evenly heated and more surface area for $CO_2$ removal is exposed. The vibration also aids turning the material as it is conveyed.

In an embodiment, covers 1540 of the segments 1500 are configured so that the infrared beam pattern 1550 of infrared emitters 1110 cover all material on the surface of floors 1510 without emitting substantial amounts of infrared energy past edges of the floors 1510. This may be achieved by a combination of the size and location of the covers 1540 with respect to the floors 1510, the placement of infrared emitters 1110 within the covers 1540, and the configuration of the infrared emitters 1110 (e.g. the beam pattern of the emitters).

The length and width of the covers 1540 may be less than the length and width of the floors 1510 to reduce the amount of material while still covering the surface of the floors 1510 with infrared beams 1550. The dimensions of the covers 1540 and floors 1510 are not particularly limited. By way of example, a floor 1510 of a segment 1500 for processing rocks of limestone ore may have a width of about one meter and a length of about 2 meters, and the cover 1540 may dimensions on a similar scale.

Figure 16:
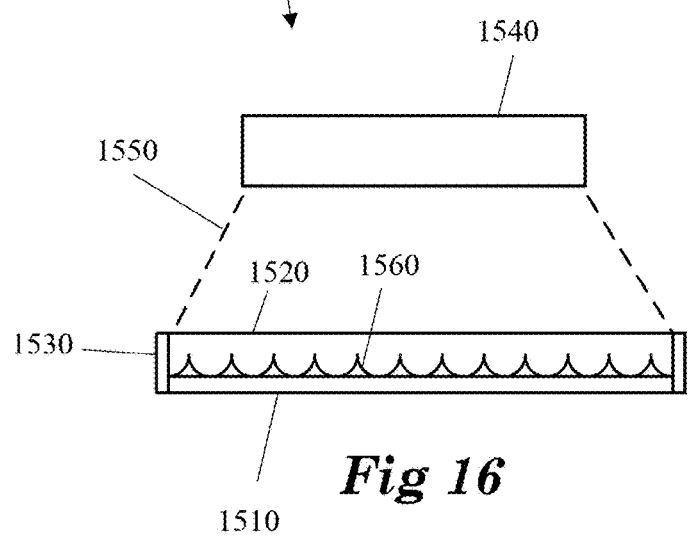
FIG. 16 illustrates an embodiment of a front view of a linear segment.

The embodiments of segments in FIG. 15 and FIG. 16 include raised backs 1520 and raised sidewalls 1530 which are configured to prevent material from falling off the sides or back ends of the segments 1500. The sidewalls 1530 may be present in various embodiments, including embodiments with helically oriented segments. Also shown in FIG. 16 are a plurality of grooves 1560 in the floor 1510.

Figure 17:
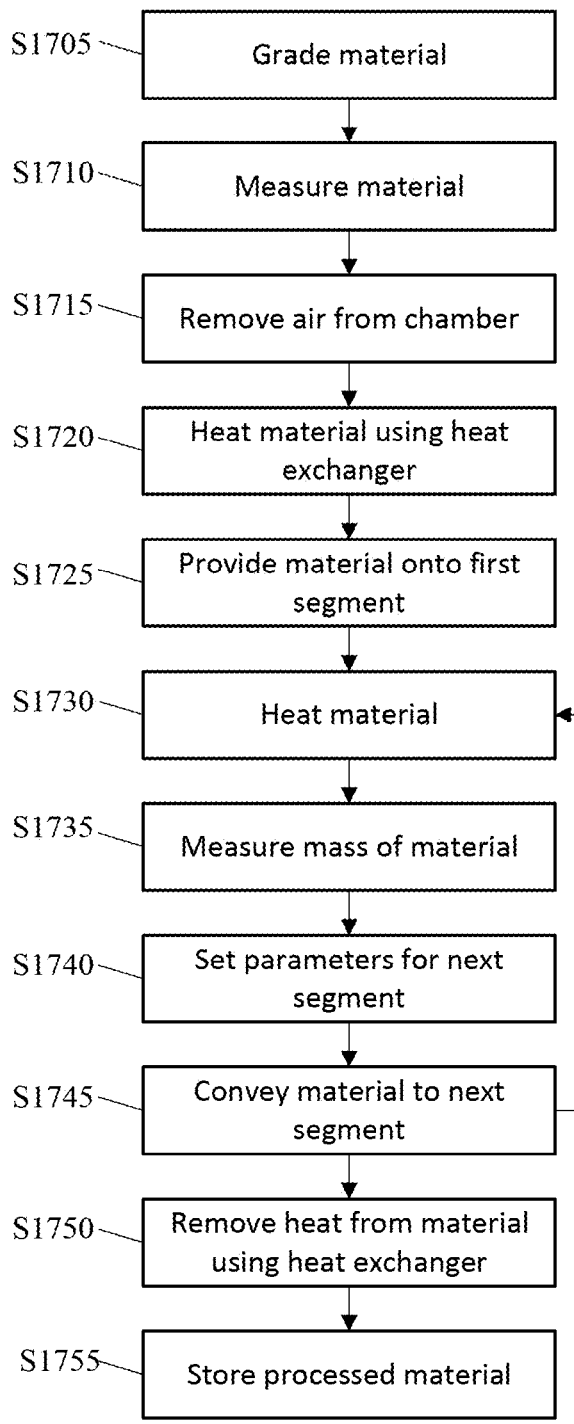
FIG. 17 illustrates an embodiment of a method for heating a material.

FIG. 17 illustrates an embodiment of a steps of a method 1700 for heating a material, and in particular, heating the material to remove a gas from the material. Method 1700 may be implemented to remove $CO_2$ from limestone, to remove $CO_2$ from limestone while creating clinker, to remove $CO_2$ from zeolite, etc. Method 1700 may be performed using any of the apparatuses or the control process 800 described above.

The material may be graded at 51705. For example, the material may be crushed, sieved or divided to sort for a desired size and composition of material to be processed. In some embodiments, the material is graded at a different site from the conveyance system.

The material is measured at S1710 using an analyzer 135. Measurements may include an initial mass measurement, elemental content, mineral content, $CO_2$ content, etc. When clinker is being made, the clinker constituents may be measured and combined in a predetermined ratio with limestone. Measuring the material at S1710 may include sorting the material into a batch, e.g. a mass of material that will be processed discretely at each segment.

Air is removed from the vacuum chamber 210 in which the material is processed at S1715. The air may be removed by a vacuum pump 350 before any material is heated at the start of process 1700, and on an ongoing basis to collect $CO_2$ and to maintain a partial pressure within the chamber 210 as described above.

The material may be heated at S1720 using a heat exchanger 320, which may recover heat from one or both of a heat exchanger 340 that removes heat from $CO_2$ gas and heat exchanger 375 that removes heat from processed material.

The material is provided to a first segment (e.g. any of segments 110, 1200, 1500 or other segments) at S1725 through input 160. When the material is processed as a batch, the entire batch is loaded onto the first segment at S1725, and the batch may be individually tracked and processed as it moves down the segments. The segment may be vibrated while being loaded with material to spread the material across the segment.

The material is heated at S1730 by activating one or more infrared heater disposed above the material. The material may be heated for a predetermined time and temperature based on the material properties determined at S1710 before it passes to the next segment.

The mass of the material is determined at S1730 by a load cell 545 disposed under the segment. In an embodiment, the mass of the material is compared to one or both of a mass measurement taken at S1710 and a mass of the material measured at a previous segment, and this information may be used by a computer 220 to set processing parameters (e.g. time and temperature) for the next segment at S1740.

The material is then conveyed to the next segment at S1745 by vibration applied to the segment, which in combination with a downwards slope of the segment slides the material off the front edge of the segment and onto the rear end of the next segment. The next segment vibrates simultaneously with the previous segment to spread the material across a lower surface or floor of the segment, and the vibration may terminate before the material reaches the lower end of the next segment.

When the material is being processed as a batch, steps S1730 to S1745 may be repeated for all segments in a conveyance system. The parameters may be set at S1740 to ensure that the material is fully processed at the final segment while minimizing over-processing. If mass measurements determine that all the $CO_2$ is removed from the material before it reaches the final segment, then the material may pass along the final segment with no or minimal heat exposure.

In an embodiment, the material may be processed in a continuous fashion with no or minimal pauses between segments. For example, the material may be conveyed and heated at a rate that removes substantially al the $CO_2$ without pausing to perform heat cycles. Material particles may have a sufficient consistency so that process parameters can be set to adequately process the material without tracking individual batches.

In another embodiment, which may be used when the material is relatively consistent, vibration may be paused intermittently to measure the mass of material on each segment at S1735 under the assumption that the volume of material on each segment is similar. In such an embodiment, mass reduction of the material can be tracked as it progresses without spacing material batches apart from one another, and the mass values can be used to adapt processing parameters as appropriate.

After passing along the final segment, heat is removed from the material using heat exchanger 375 at S1750, and the material passes out vacuum valve 390. The processed material is stored in a sealed container at S1755 to prevent recombination with the released gas, e.g. $CO_2$.

Figure 18:
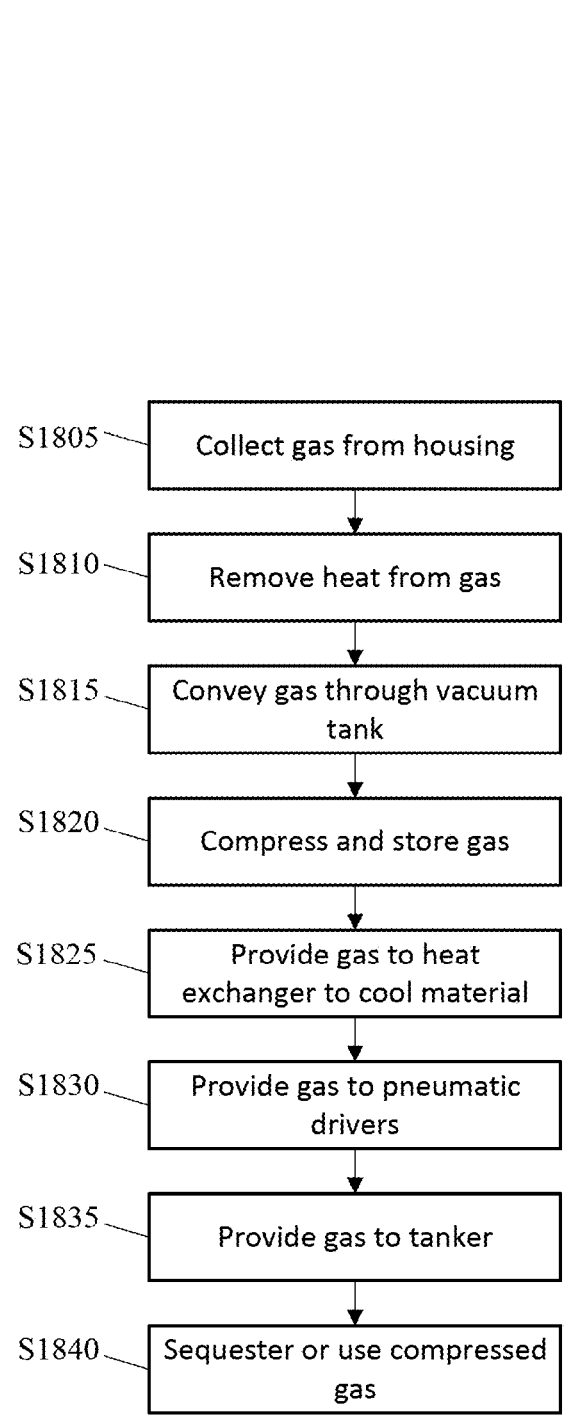
FIG. 18 illustrates an embodiment of a method for processing gas while heating a material.

FIG. 18 illustrates an embodiment of a method 1800 for processing gas, steps of which may be performed in conjunction with method 1700.

Gas, e.g. $CO_2$ gas 338, is collected at S1805 from housing 210 through vacuum port 337. The gas may be collected by using a vacuum pump 350 to create a lower pressure in the vacuum line than the housing 210. As gas 338 is removed from the housing 210, it may pass through a heat exchanger 340 that removes heat from the gas at S1810. The heat removed from the gas may be provided to heat exchanger 320 to pre-heat material passing into the tank 210 at S1720.

The collected gas moves through vacuum tank 345 at S1815 where the gas is cooled before being passed through vacuum pump 350 coupled to the tank. When no heat exchanger 320 is present, heat may be removed from the gas at S1810 while the gas is in the tank 345, e.g. by cooling the tank with a fluid. After passing through the vacuum pump 350, the gas is compressed by compressor 355 and the compressed gas is stored in gas storage tank 360 at S1820.

The cooled and compressed gas may be provided at S1825 to heat exchanger 375 to remove heat from processed material 380 as described with respect to S1750. In addition, compressed gas may be provided as a pneumatic fluid to pneumatic driver assemblies 600 at S1830 to cause the drivers to vibrate segments. In an embodiment in which gas from the pneumatic driver assemblies 600 is vented into the tank 210, the gas recirculates through the system by being collected again at S1805.

Additional gas stored in storage tank 360 may be conveyed to a mobile platform such as a tanker 365 at S1835 to be transported to a different location. The tanker 365 may drive to a remote location where the gas is sequestered or used for another industrial purpose at S1840. In some embodiments, compressed gas is transported to a different location within the same facility in which method 1700 is performed to sequester or use the compressed gas.

The control capability and flexibility of embodiments of the present disclosure provide precise control of complex thermal solids chemistry reactions that are important in the industrialized world. A system can be tuned under software control to convert limestone to lime or to convert lime and several clay constituent materials to clinker, which can be ground down to form cement. Both of these applications are highly efficient and can be implemented as zero-carbon emission processes.

Embodiments are not limited to systems and processes for making lime or clinker using limestone. For example, embodiments can be used to remove $CO_2$ or other gasses from zeolite or other materials. The processing of ferrous and non-ferrous metals uses lime to capture impurities, some of which can be removed by embodiments of the present disclosure so that the lime can be re-used. In such embodiments, the gas emitted by the material 330 may include sulfur or cyanide or organic compounds.

When processed lime is recombined with $CO_2$, heat is released by an exothermic reaction. Accordingly, embodiments of the present disclosure can be used to store energy in the form of processed lime that is recovered as heat when the lime is subsequently exposed to $CO_2$.

Embodiments can be part of a carbon capture process, for example by providing a substrate such as zeolite or lime at a source of carbon emissions (or more generally, exposing those materials to atmosphere) to remove $CO_2$, and using embodiments of the present disclosure to liberate the $CO_2$ from the substrate and collect the $CO_2$ in a concentrated form.

Embodiments of the methods and apparatuses presented here can be used to produce medical grade lime in industrial quantities, with a significant energy reduction over current combustion-based kiln processes for separating the $CO_2$ from the calcium oxide (CaO) in the limestone. This new process makes physically better lime with consistent porosity and purer lime with low levels of contaminants. Embodiments can avoid releasing any $CO_2$ to the atmosphere, and are appropriate for use in vertical markets such as medical, steel, concrete, and glass.

The invention claimed is:

1. A method for removing carbon dioxide from a material, the method comprising:
   introducing the material onto a first segment of a conveyance system comprising the first segment and a second segment that is physically separated and located below the first segment;
   heating the material at the first segment for a first time using a first infrared emitter;
   conveying the material from the first segment to the second segment; and
   heating the material at the second segment for a second time using a second infrared emitter,
   wherein heating the material removes carbon dioxide from the material.

2. The method of claim 1, wherein the material includes a zeolite.

3. The method of claim 1, wherein the material includes limestone ore.

4. The method of claim 1, wherein the material is a clinker precursor.

5. The method of claim 1, further comprising:
   performing a first mass measurement of the material on the first segment;
   performing a second mass measurement of the material on the second segment;
   setting at least one of a time and a temperature for heating the material on a third segment based on the first and second mass measurements; and
   conveying the material from the second segment to the third segment.

6. The method of claim 1, wherein conveying the material includes vibrating the first segment and the second segment.

7. The method of claim 6, wherein the first segment is above the second segment, and vibrating the material causes the material to fall from an end of the first segment onto the second segment.

8. The method of claim 1, further comprising turning the material over by vibrating the second segment.

9. The method of claim 1, wherein the heating is performed under a pressure of is 0.5 atmospheres or less.

10. The method of claim 1, wherein the heating is performed under a pressure of is 0.2 atmospheres or less.

11. The method of claim 1, wherein the first segment is above the second segment, and conveying the material from the first segment to the second segment includes advancing the material so the material falls from the first segment onto the second segment.

12. The method of claim 11, wherein the material is churned as the material falls from the first segment onto the second segment.

13. The method of claim 1, further comprising:
collecting carbon dioxide released from the material;
pressurizing the collected carbon dioxide; and
providing at least a portion of the pressurized carbon dioxide to a first pneumatic driver and a second pneumatic driver to agitate the first and second segments, respectively.

14. The method of claim 1, wherein the first and second segments are within a housing coupled to a vacuum pump, the method further comprising:
collecting the carbon dioxide removed from the material by the vacuum pump; and
storing at least a portion of the carbon dioxide collected by the vacuum pump.

15. A method for removing carbon dioxide from a material, the method comprising:
introducing the material onto a first segment of a conveyance system comprising the first segment and a second segment that is physically separated from the first segment;
heating the material at the first segment for a first time using a first infrared emitter;
performing a first mass measurement of the material on the first segment;
conveying the material from the first segment to the second segment;
heating the material at the second segment for a second time using a second infrared emitter;
performing a second mass measurement of the material on the second segment;
setting at least one of a time and a temperature for heating the material on a third segment based on the first and second mass measurements; and
conveying the material from the second segment to the third segment,
wherein heating the material removes carbon dioxide from the material.

* * * * *